(12) United States Patent
Woynorowski

(10) Patent No.: US 12,207,591 B1
(45) Date of Patent: Jan. 28, 2025

(54) PARKING BRAKE CONTROL FOR RIDE-ON ZERO-TURN WORK MACHINES

(71) Applicant: Yakta Inc., Winnipeg (CA)

(72) Inventor: Evan Woynorowski, Woodlands (CA)

(73) Assignee: Yakta Inc., Winnipeg (CA)

( * ) Notice: Subject to any disclaimer, the term of this patent is extended or adjusted under 35 U.S.C. 154(b) by 0 days.

(21) Appl. No.: 18/637,155

(22) Filed: Apr. 16, 2024

(51) Int. Cl.
 *A01D 34/68* (2006.01)
 *B60T 7/10* (2006.01)
 *B60T 11/04* (2006.01)

(52) U.S. Cl.
 CPC .......... *A01D 34/6812* (2013.01); *B60T 7/102* (2013.01); *B60T 11/04* (2013.01); *A01D 2034/6843* (2013.01)

(58) Field of Classification Search
 CPC . B60T 7/02; B60T 11/04; B60T 7/104; B60T 7/105; B60T 1/06; B60T 13/588; B60T 11/21; A01D 34/6812; A01D 2034/6843; A01D 69/10
 See application file for complete search history.

(56) References Cited

U.S. PATENT DOCUMENTS

| | | | | |
|---|---|---|---|---|
| 5,020,308 A * | 6/1991 | Braun | ................. | B62D 51/002 56/11.5 |
| 6,434,917 B1 * | 8/2002 | Bartel | .................... | A01D 34/64 56/14.7 |
| 6,729,115 B2 | 5/2004 | Bartel | | |
| 7,299,610 B2 | 11/2007 | Pionek | | |
| 7,451,865 B2 * | 11/2008 | Eavenson, Sr. | ...... | B62D 11/006 56/11.3 |
| 7,677,371 B2 | 3/2010 | Dong et al. | | |
| 7,686,108 B2 * | 3/2010 | Piontek | ................. | A01D 69/10 180/6.48 |
| 7,954,907 B1 * | 6/2011 | Wieber | ................. | A01D 69/10 188/106 P |
| 8,240,420 B1 | 8/2012 | Bartel et al. | | |
| 8,245,509 B1 | 8/2012 | Langenfeld et al. | | |
| 8,418,452 B1 | 4/2013 | Phanco et al. | | |
| 8,511,417 B2 * | 8/2013 | Corriher | ................ | F16D 55/22 180/312 |
| 9,308,817 B1 | 4/2016 | Phanco et al. | | |
| 9,313,953 B2 | 4/2016 | Borshov et al. | | |
| 10,045,485 B2 | 8/2018 | Burns et al. | | |

(Continued)

*Primary Examiner* — Bradley T King
*Assistant Examiner* — James K Hsiao
(74) *Attorney, Agent, or Firm* — Kyle R Satterthwaite; Ryan W Dupuis; Ade & Company Inc.

(57) ABSTRACT

A ride-on zero-turn work machine has two drive control levers longitudinally pivotable for locomotive and steering control, and laterally tiltable inboard and outboard for parking brake control. Two brake control linkages are each connected between one of the levers and one of the parking brakes. Each linkage features a rotatable bell crank, a brake connection link running from the bell crank to the parking brake, and a lever connection link having one end coupled to the bell crank, and another coupled to drive control lever. The bell crank is a flat plate to which the links are coupled at a same common side, and whose outer perimeter includes a cam profile that is engaged by a cam follower to resist movement of the control lever between inboard and outboard positions. The perimeter edge of each bell crank also engages a position detection switch in one of the inboard and positions.

19 Claims, 12 Drawing Sheets

(56) References Cited

U.S. PATENT DOCUMENTS

| | | | |
|---|---|---|---|
| 10,414,436 B1 | 9/2019 | Bonny | |
| 10,619,685 B2 * | 4/2020 | Shank | B60T 1/005 |
| 10,681,867 B2 | 6/2020 | Dunbar et al. | |
| 10,834,870 B2 | 11/2020 | Wagner | |
| 10,888,047 B2 * | 1/2021 | Yasuda | B60T 13/588 |
| 10,974,597 B1 | 4/2021 | Manji | |
| 10,981,589 B1 | 4/2021 | Bartel et al. | |
| 10,986,782 B2 * | 4/2021 | Fisher | A01D 34/82 |
| 11,247,652 B2 * | 2/2022 | Matsuda | F16D 65/18 |
| 11,357,170 B1 | 6/2022 | Funk et al. | |
| 2003/0000192 A1 * | 1/2003 | Busboom | A01D 34/6806 |
| | | | 56/10.8 |
| 2004/0000130 A1 * | 1/2004 | Bartel | A01D 34/69 |
| | | | 56/11.3 |
| 2006/0174601 A1 | 8/2006 | Piontek | |
| 2008/0190084 A1 * | 8/2008 | Piontek | B60T 11/21 |
| | | | 56/11.3 |
| 2010/0122875 A1 | 5/2010 | Corriher | |
| 2012/0167537 A1 * | 7/2012 | Corriher | F16D 55/22 |
| | | | 56/14.7 |
| 2014/0262630 A1 | 9/2014 | Borshov et al. | |
| 2017/0113721 A1 | 4/2017 | Slegelis et al. | |
| 2019/0141889 A1 * | 5/2019 | Fisher | B62D 11/005 |
| | | | 56/10.7 |
| 2019/0219116 A1 * | 7/2019 | Matsuura | F16D 65/16 |
| 2019/0230863 A1 | 8/2019 | Yasuda et al. | |
| 2019/0270435 A1 * | 9/2019 | Matsuura | F16H 63/3441 |
| 2019/0274251 A1 | 9/2019 | Dunbar et al. | |
| 2021/0086831 A1 | 3/2021 | Ikeda | |
| 2021/0237790 A1 | 8/2021 | Bartel et al. | |
| 2021/0307251 A1 * | 10/2021 | Fisher | A01D 34/82 |
| 2022/0287233 A1 * | 9/2022 | Feldkamp | A01D 34/824 |
| 2022/0295702 A1 | 9/2022 | Funk et al. | |
| 2022/0312668 A1 | 10/2022 | Manji et al. | |

\* cited by examiner

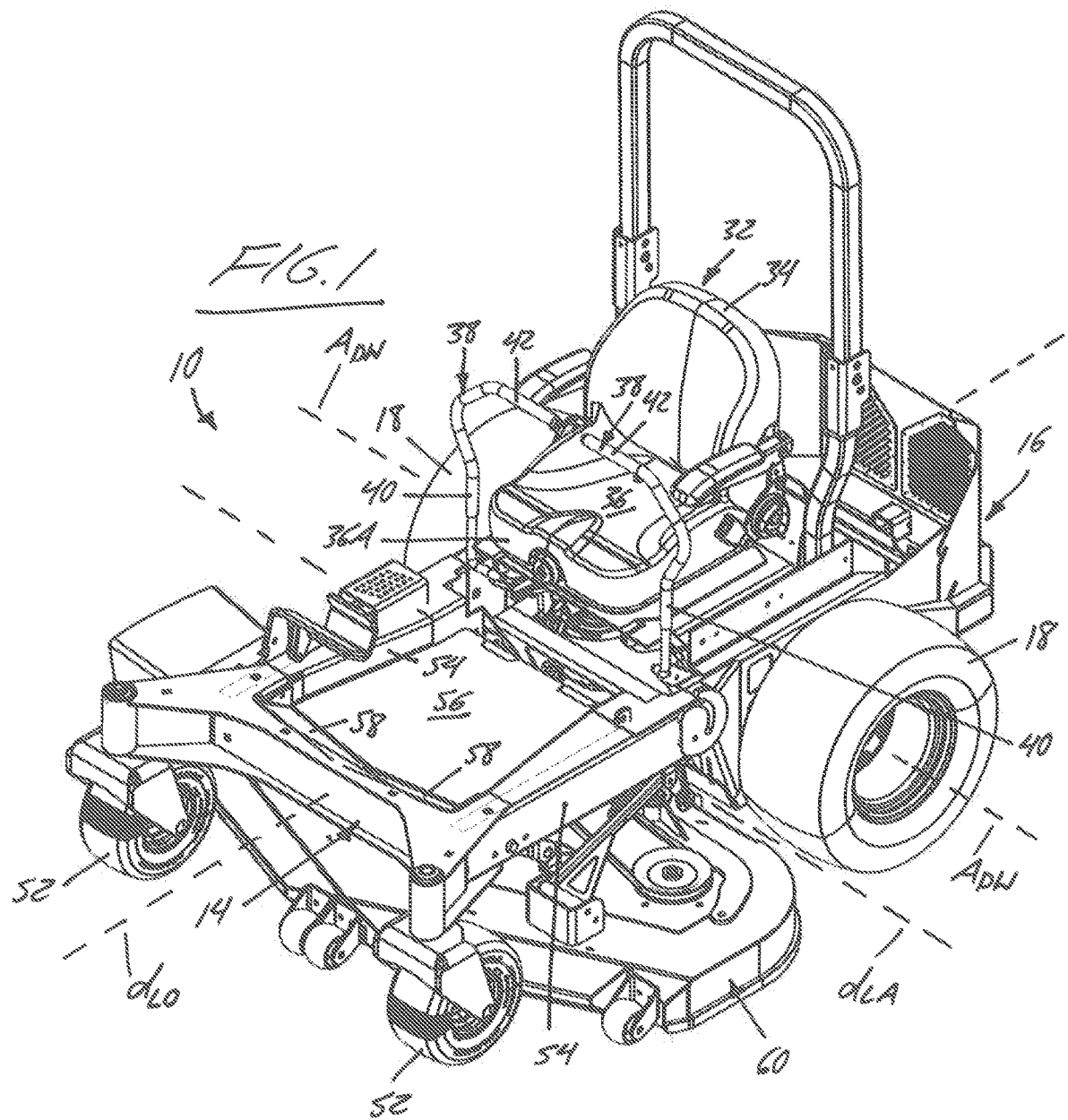

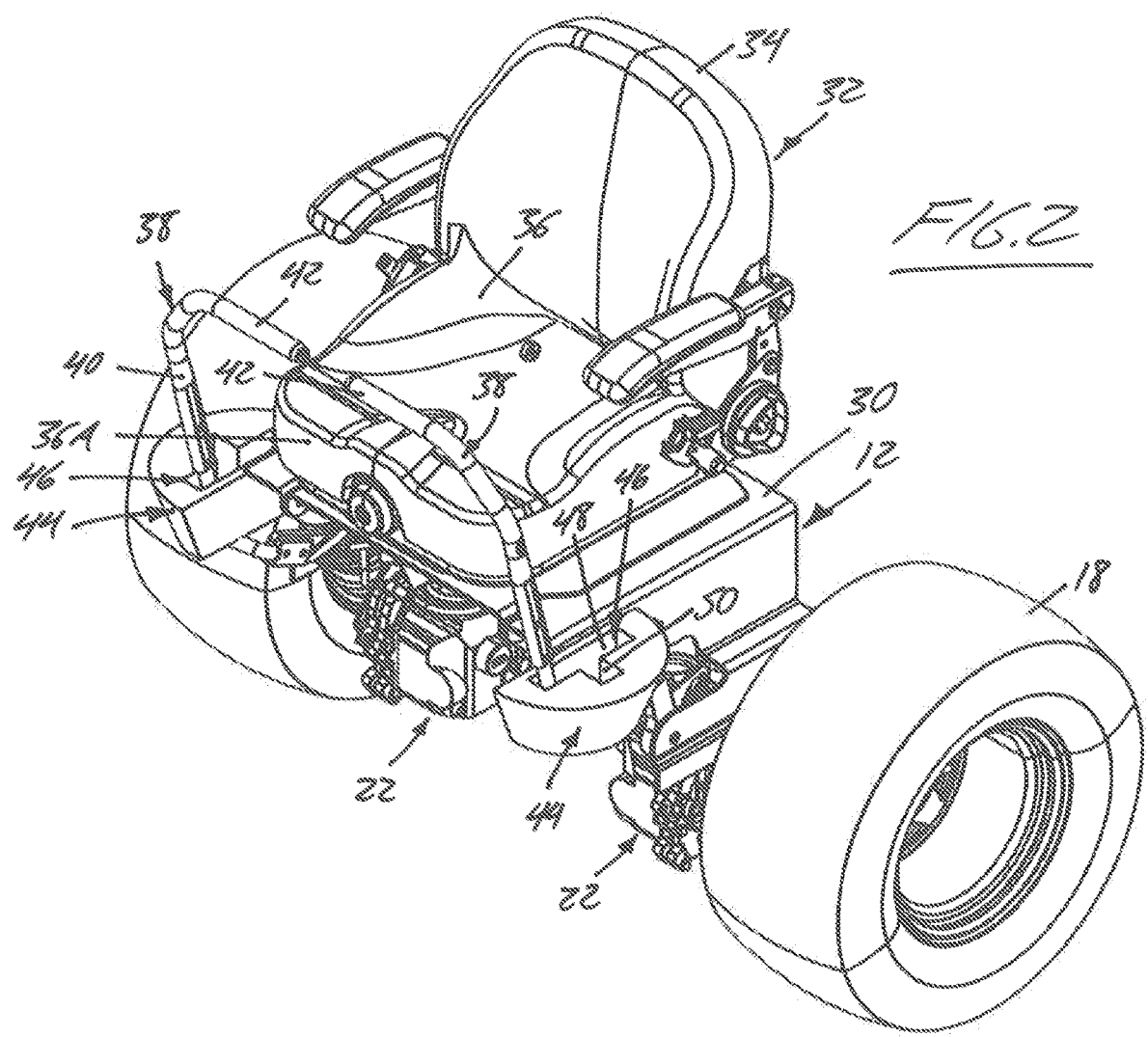

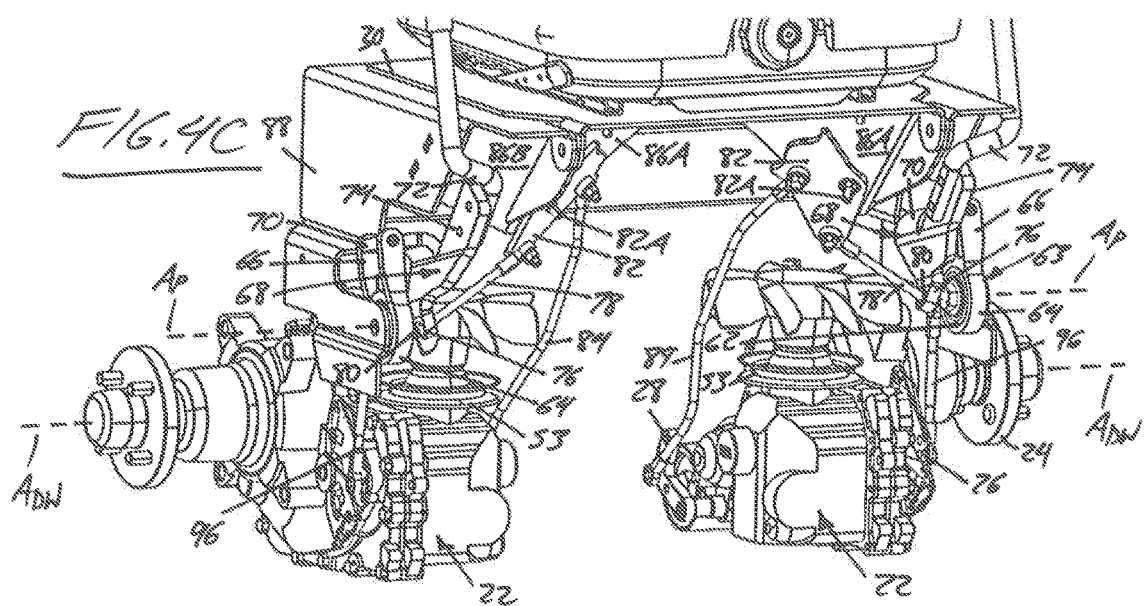
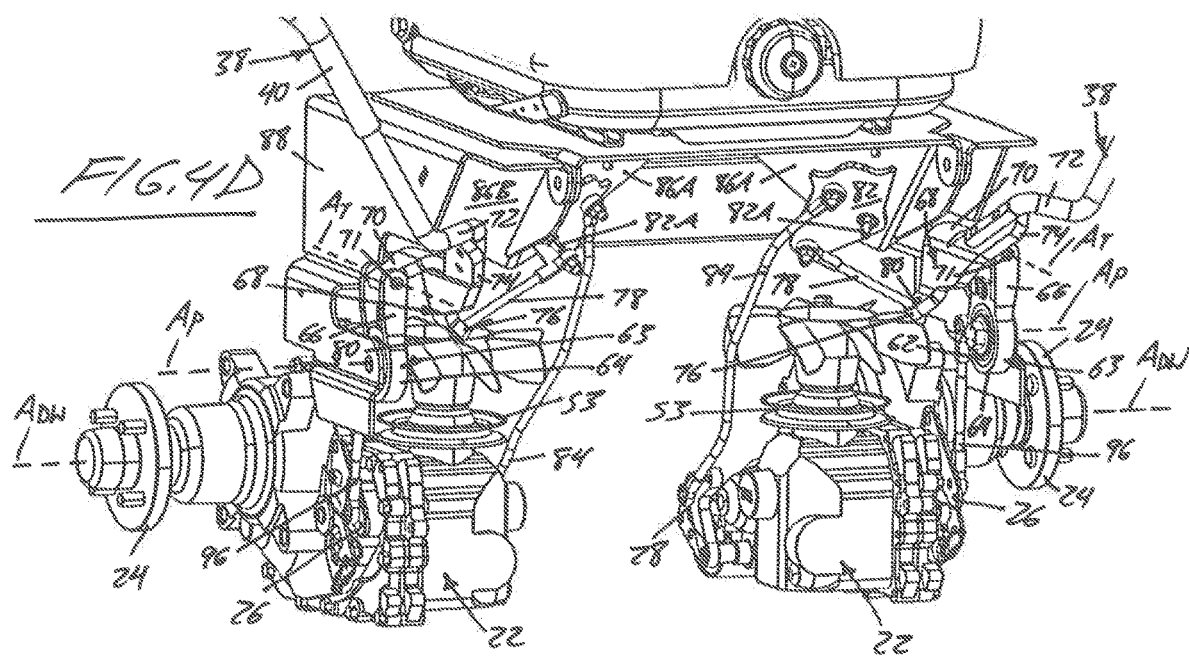

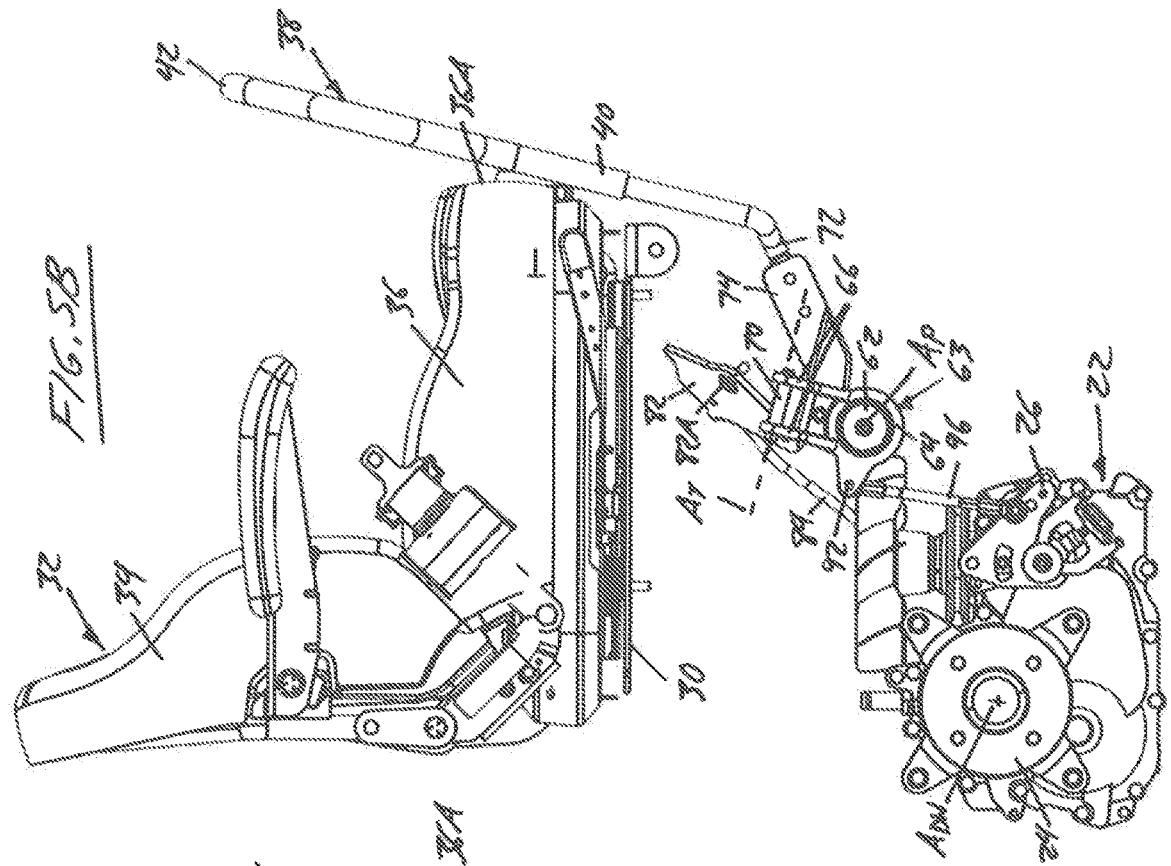

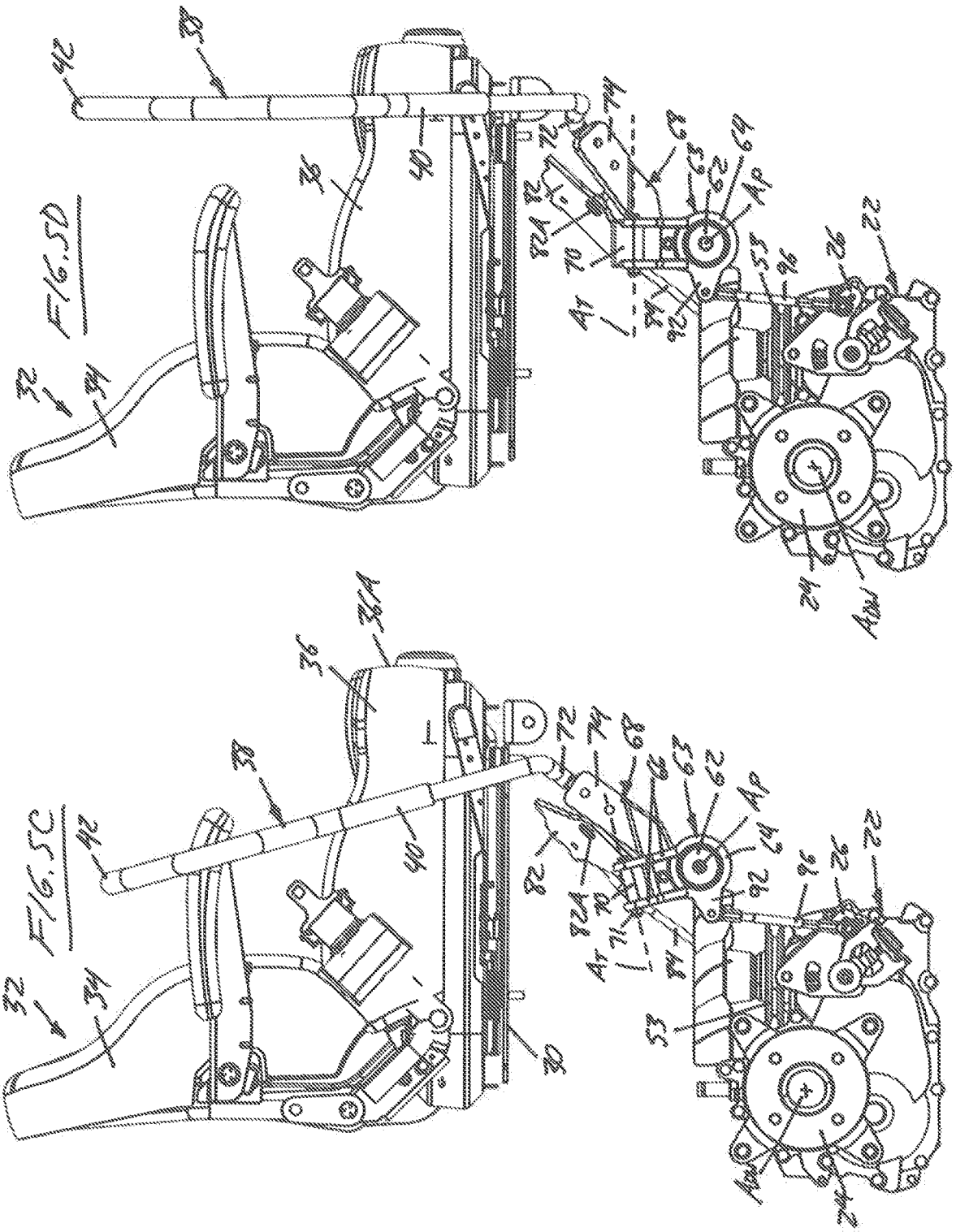

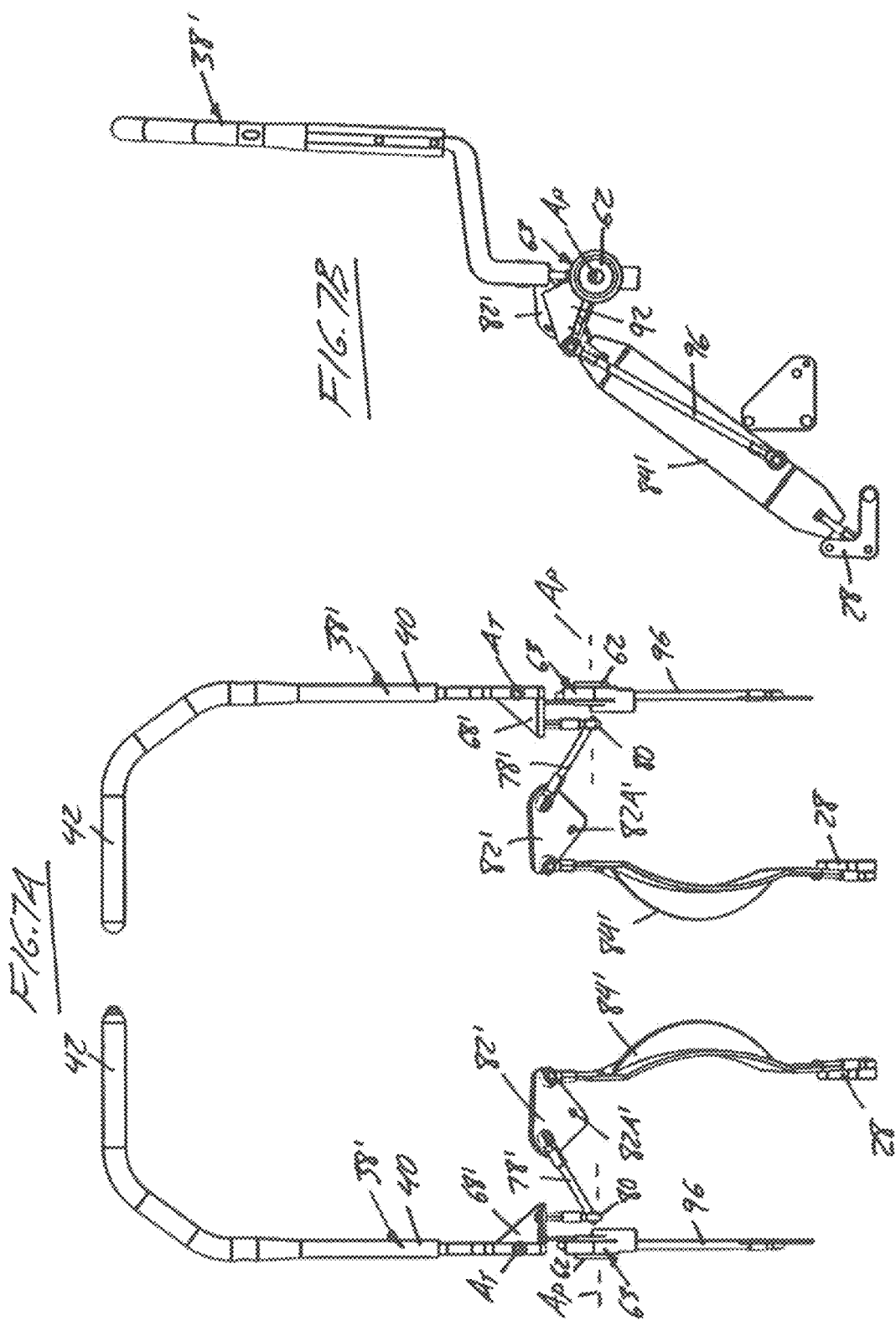

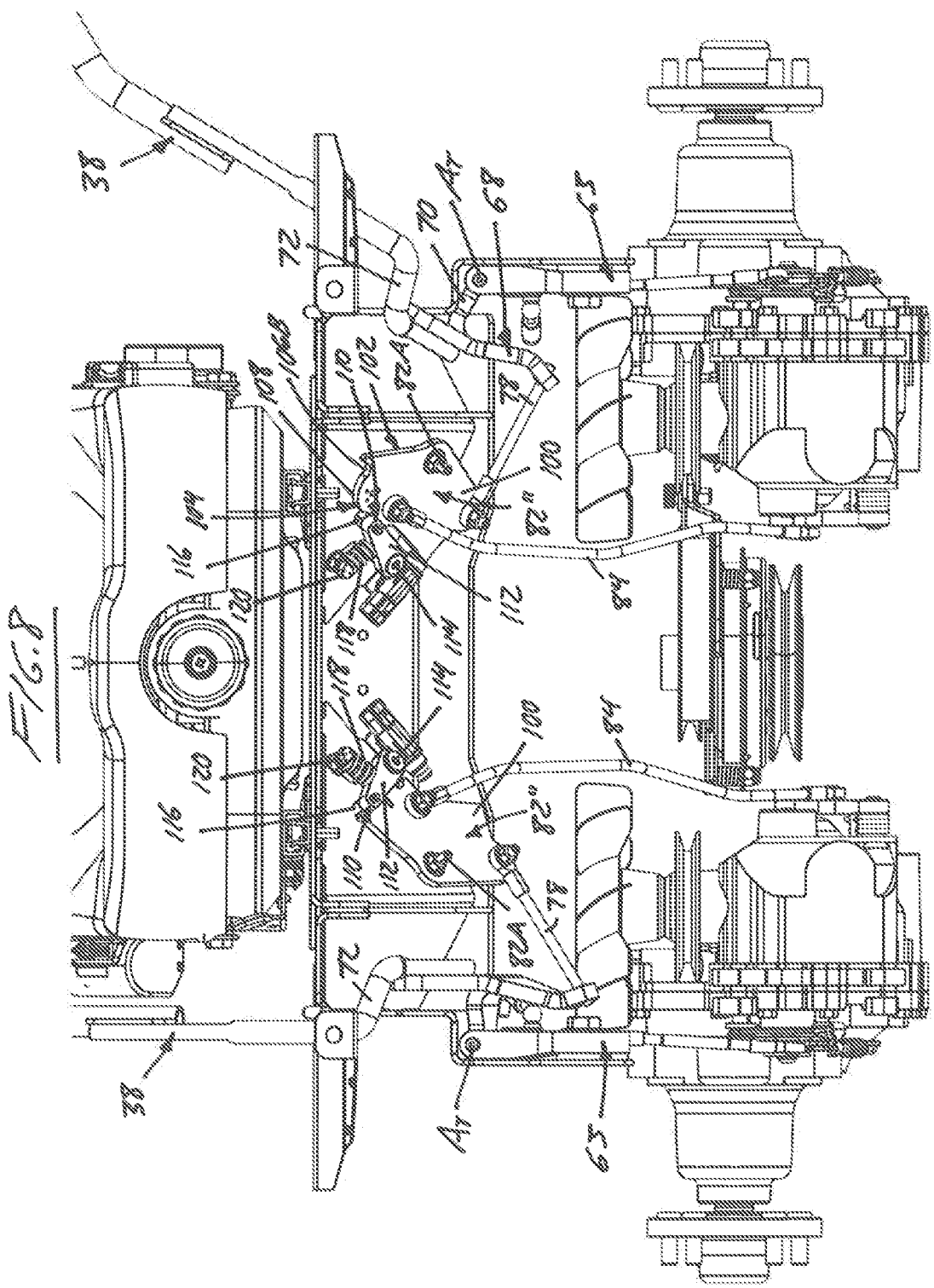

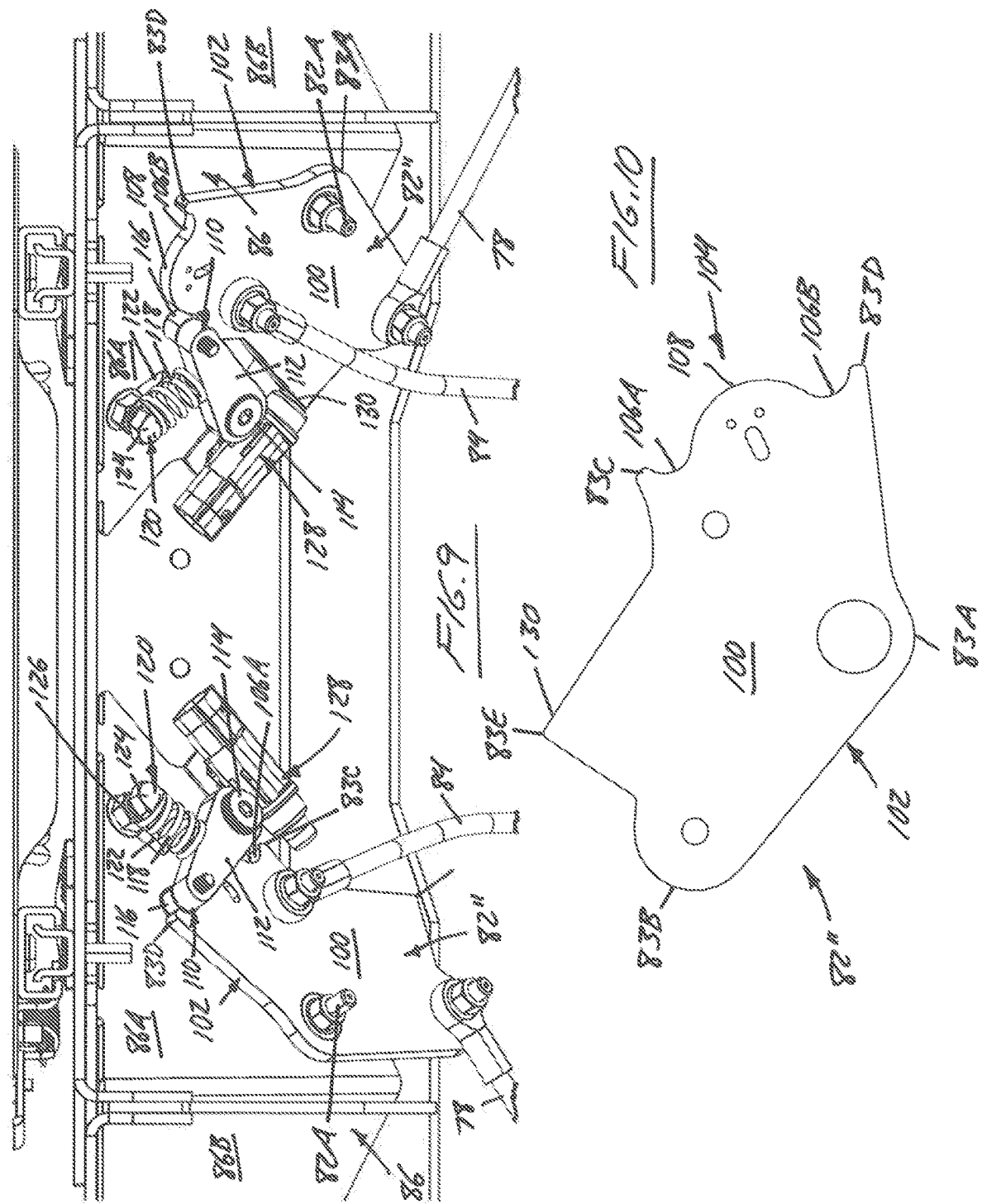

PARKING BRAKE CONTROL FOR RIDE-ON ZERO-TURN WORK MACHINES

CROSS-REFERENCE TO RELATED APPLICATIONS

This application claims foreign priority benefit under 35 U.S.C. 119 (a) of PCT Application No. PCT/CA2023/050992, filed Jul. 25, 2023, PCT Application No. PCT/CA2023/051366, filed Oct. 13, 2023, both of which are incorporated herein by reference in their entirety.

FIELD OF THE INVENTION

The present invention relates generally to zero-turn ride-on work machines, for example zero-turn ride-on mowers, and more particularly to the design of brake control linkages operable to parking brakes of such machines in response to outward lateral tilting of drive control levers thereof.

BACKGROUND

In the field of zero-turn ride-on mowers, it is commonplace to use a pair of drive control levers that stand upright from a frame of the machine at opposite sides of a driver's seat to control both locomotion and differential steering of the mower through a pair of independently driven wheels rotatably supported at opposing lateral sides of the frame. As is well understood in the art, the two drive wheels are each capable of driven rotation in both directions, and may be driven at the same or different speeds, and in matching or opposing direction, to one another. This enables various states of machine travel and steering, including: straight locomotion of the machine in a forward travel direction via driven rotation of both wheels at the same speed in a matching forward rotational direction to one another; straight locomotion of the machine in a reverse travel direction via driven rotation of both wheels at the same speed in a matching reverse rotational direction to one another; turning locomotion in either the forward or reverse travel direction via driven rotation of both wheels in the same rotational direction but at different speeds (differential steering), where the slower of the two drive wheels defines an inside of the turn, denoting the direction in which the machine is thereby steered, and the faster of the two drive wheels defines an outside of the turn; and turn-in-place steering where the two wheels are driven in opposing rotational direction to one another at the same speed to effectively swivel the machine in place about an upright axis central of the machine width for an effective turning radius of zero or near-zero measure (hence, the "zero-turn" naming designation associated with this type of machine).

Conventionally, the drive wheels are hydraulically driven by respective hydraulic motors fed by respective hydraulic pumps, which in turn are rotationally powered by a shared internal combustion engine, which thereby denotes a prime mover from which all locomotive power of the machine is derived. Each control lever is pivotable longitudinally of the machine (forward and rearward) about a lateral pivot axis to control the rotational direction and speed of the corresponding drive wheel on the same side of the frame, doing so via movement of a respective drive control linkage connected between that control lever and a swashplate control point on the respective hydraulic pump of the respective drive wheel. Commonly, each control lever may also be laterally tiltable about an axis lying longitudinally of the machine front, between a normal inboard driving position, in which the upright lower segments of the control levers reside in generally vertical and parallel planes, such that the in-turned upper handle segments reside directly in front of the driver's seat for drive-control manipulation thereof by the driver, and an outboard position in which the drive control levers are tilted laterally outward from the normal inboard driving position to place the lower sections of the control levers in outwardly inclined planes of upwardly divergent relation to one another. The outboard position opens up a larger space between the upper handle segments of the control levers in front of the driver seat, thus enabling the driver to more easily maneuver into and out of the driver seat.

Such laterally outward tilting of each control lever to the outboard position is permitted only in a neutral position of the control lever's longitudinal pivot range, which corresponds to a stopped condition of the respective drive wheel (i.e. corresponding to the neutral zero-displacement position of the respective hydraulic pump), and such outboard tilting may be operable to automatically engage a parking brake of each drive wheel, serving as a notable safety precaution. Expired U.S. Pat. No. 6,434,917 discloses an early example of such parking brake control, in which respective mechanical linkages operated by the drive control levers not only have links for controlling the swashplate positions of the respective pumps, but also links for actuating brake shoes of respective parking brakes of the two drive wheels. The disclosed design in that patent was for a machine in which the hydraulic motors, hydraulic pumps and parking brakes were embodied as three separate and independent components, and whose relative locations on the machine vary from many modern mower designs that instead employ hydraulic transaxles in which such componentry, or at least a subset thereof, is instead embodied in a combined transaxle unit.

In the meantime, some have turned to other brake control solutions, for example substituting rigid mechanical links for flexible Bowden cables in the connection between the drive levers and parking brakes, or a switchover to electronically implemented brake controls. U.S. Pat. No. 8,240,420 discloses one example where the outboard position of the control lever is detected by sensor responsible for engagement of the parking brake. In the same patent, a cam plate on the control lever cooperates with a cam follower on a pivot bracket assembly whose pivotal movement accommodates transition of the lever between the inboard and outboard positions, whereby engagement between the cam and cam follower tends to hold the control lever in the inboard or outboard positions, absent manual urging of the control lever with sufficient force to overcome such hold.

In development of a novel zero-turn ride-on mower of their own design, Applicant has designed an alternative mechanical linkage-based parking brake control solution may be put to beneficial use in not only their new mower, but also on other modern zero-turn work machines.

SUMMARY OF THE INVENTION

According to a first aspect of the invention, there is provided a ride-on zero-turn work machine comprising:
 a frame;
 two drive wheels rotatably supported at opposing lateral sides of the frame for driven locomotion and steering of the machine;
 two caster wheels rotatably supported in respective adjacency to said opposing lateral sides of the frame in positions of leading relation to the drive wheels in a forward travel direction of the machine;

two variable flow hydraulic pumps each having an external swashplate control via which an internal swashplate of the pump is repositionable to vary output flow from said pump;

two hydraulic motors respectively installed in operative relation between the two pumps and the two drive wheels to effect driven rotation of the drive wheels using said output flow from said pumps;

a pair of drive control levers each movably supported on frame in a manner pivotable longitudinally forward and rearward, about a lateral pivot axis, from a neutral position to control a rotational direction and speed of a respective one of the drive wheels, and also laterally tiltable, in said neutral position, between an inboard driving position, and an outboard braking position tilted laterally outward therefrom;

two parking brakes of respectively operable relation to the two drive wheels, and actuable between locked states preventing rotation of said drive wheels and unlocked states allowing rotation of said drive wheels;

two brake control linkages, each connected between a respective one of the drive control levers and a respective one of the parking brakes, each of said brake control linkages comprising:
  a bell crank movably mounted to the frame for rotatable movement relative thereto about a rotational support point;
  a lever connection link having a first end coupled to the bell crank, and a second end coupled to a respective one of the drive control levers;
  a brake connection link having a first end coupled to the bell crank, and a second end coupled to the respective one of the parking brakes;
  a cam provided on a first one of either the frame or the bell crank; and
  a cam follower provided on a second of either the frame or the bell crank at a location adjacent the cam and biased into engagement therewith;

wherein a shape profile of the cam of each brake control linkage comprises a first recess whose relative location within said shape profile is one occupied by the cam follower when the respective one of the drive control levers is in the outboard braking position, a second recess whose relative location within said shape profile is one occupied by the cam follower when the respective one of the drive control levers is in the inboard driving position, and an intermediary region that is disposed between said first and second recesses and is of raised relation thereto within said shape profile so as to, via contact between the cam follower and said intermediary region, impart physical resistance to rotation of the bell crank during transition of the respective one of the drive control levers between the inboard driving position and the outboard braking position, which resistance must be overcome via manual urging of the drive control levers with sufficient force to overcome said resistance.

According to a second aspect of the invention, there is provided a ride-on zero-turn work machine comprising:
a frame;
two drive wheels rotatably supported at opposing lateral sides of the frame for driven locomotion and steering of the machine;
two caster wheels rotatably supported in respective adjacency to said opposing lateral sides of the frame in positions of leading relation to the drive wheels in a forward travel direction of the machine;

two variable flow hydraulic pumps each having an external swashplate control via which an internal swashplate of the pump is repositionable to vary output flow from said pump;

two hydraulic motors respectively installed in operative relation between the two pumps and the two drive wheels to effect driven rotation of the drive wheels using said output flow from said pumps;

a pair of drive control levers each movably supported on frame in a manner pivotable longitudinally forward and rearward, about a lateral pivot axis, from a neutral position to control a rotational direction and speed of a respective one of the drive wheels, and also laterally tiltable, in said neutral position, between an inboard driving position, and an outboard braking position tilted laterally outward therefrom;

two parking brakes of respectively operable relation to the two drive wheels, and actuable between locked states preventing rotation of said drive wheels and unlocked states allowing rotation of said drive wheels;

two brake control linkages, each connected between a respective one of the drive control levers and a respective one of the parking brakes, each of said brake control linkages comprising:
  a bell crank movably mounted to the frame for rotatable movement relative thereto about a rotational support point;
  a lever connection link having a first end coupled to the bell crank, and a second end coupled to a respective one of the drive control levers; and
  a brake connection link having a first end coupled to the bell crank, and a second end coupled to the respective one of the parking brakes;

wherein at least one of the brake linkages is further characterized by at least one of the following features:
(a) the bell crank is a flat plate of uniplanar form;
(b) the lever connection link and the brake connection link of each brake control linkage are both coupled to the bell crank at a same common side thereof; and/or
(c) the bell crank has a profiled edge whose shape profile comprises a first recess, a second recess, and a crested intermediary region that is disposed between said first and second recesses and is of raised relation thereto within said shape profile.

According to a third aspect of the invention, there is provided a ride-on zero-turn work machine comprising:
a frame;
two drive wheels rotatably supported at opposing lateral sides of the frame for driven locomotion and steering of the machine;
two caster wheels rotatably supported in respective adjacency to said opposing lateral sides of the frame in positions of leading relation to the drive wheels in a forward travel direction of the machine;
two variable flow hydraulic pumps each having an external swashplate control via which an internal swashplate of the pump is repositionable to vary output flow from said pump;
two hydraulic motors respectively installed in operative relation between the two pumps and the two drive wheels to effect driven rotation of the drive wheels using said output flow from said pumps;
a pair of drive control levers each movably supported on frame in a manner pivotable longitudinally forward and rearward, about a lateral pivot axis, from a neutral position to control a rotational direction and speed of a respective one of the drive wheels, and also laterally tiltable, in said neutral position, between an inboard driving position, and an outboard braking position tilted laterally outward therefrom;

two parking brakes of respectively operable relation to the two drive wheels, and actuable between locked states preventing rotation of said drive wheels and unlocked states allowing rotation of said drive wheels;

two brake control linkages, each connected between a respective one of the drive control levers and a respective one of the parking brakes, each of said brake control linkages comprising:

a bell crank movably mounted to the frame for rotatable movement relative thereto about a rotational support point;

a lever connection link having a first end coupled to the bell crank, and a second end coupled to a respective one of the drive control levers; and a brake connection link having a first end coupled to the bell crank, and a second end coupled to the respective one of the parking brakes; and for each of said brake control linkages, a respective position detection switch positioned for actuation by a perimeter edge of the bell crank when the respective one of the drive control levers is in one of said inboard driving and outboard braking positions, whereby the bell crank doubles as a switch actuator for said respective position detection switch.

According to a fourth aspect of the invention, there is provided a ride-on zero-turn work machine comprising:

a frame;

two drive wheels rotatably supported at opposing lateral sides of the frame for driven locomotion and steering of the machine;

two caster wheels rotatably supported in respective adjacency to said opposing lateral sides of the frame in positions of leading relation to the drive wheels in a forward travel direction of the machine;

two variable flow hydraulic pumps each having an external swashplate control via which an internal swashplate of the pump is repositionable to vary output flow from said pump;

two hydraulic motors respectively installed in operative relation between the two pumps and the two drive wheels to effect driven rotation of the drive wheels using said output flow from said pumps;

a pair of drive control levers each movably supported on frame in a manner pivotable longitudinally forward and rearward, about a lateral pivot axis, from a neutral position to control a rotational direction and speed of a respective one of the drive wheels, and also laterally tiltable, in said neutral position, between an inboard driving position, and an outboard braking position tilted laterally outward therefrom;

two parking brakes of respectively operable relation to the two drive wheels, and actuable between locked states preventing rotation of said drive wheels and unlocked states allowing rotation of said drive wheels;

two brake control linkages, each connected between a respective one of the drive control levers and a respective one of the parking brakes, each of said brake control linkages comprising:

a pivot member journaled about the pivot axis of the respective control lever;

a tilt bracket to which the respective control lever is attached, and having a hinged connection to the pivot member that defines a tilt axis which the lateral tilting of the respective control lever occurs;

a bell crank movably mounted to the frame for rotatable movement relative thereto about a rotational support point;

a lever connection link having a first end coupled to the bell crank, and a second end coupled to the tilt bracket; and a brake connection link having a first end coupled to the bell crank, and a second end coupled to the respective one of the parking brakes.

BRIEF DESCRIPTION OF THE DRAWINGS

Preferred embodiments of the invention will now be described in conjunction with the accompanying drawings in which:

FIG. 1 is a top front perspective view of a zero-turn ride-on mower, as one non-limiting example of an operating context for novel parking brake control linkages of the present invention.

FIG. 2 is a top front perspective view of an isolated rear half of the mower of FIG. 1, in simplified form with many components omitted for illustrative purpose, and with schematically illustrated lever-constraint brackets added for the purpose of describing various operating positions of the mower's two drive control levers.

FIG. 4C is a partial closeup of the isolated mower half of FIG. 3C with the drive wheels thereof again removed for illustrative purpose.

FIG. 4D is a partial closeup of the isolated mower half of FIG. 3D with the drive wheels thereof again removed for illustrative purpose.

FIG. 5A is a side elevational view of the isolated mower half of FIG. 4A with more componentry thereof omitted for illustrative purpose.

FIG. 5B is a side elevational view of the isolated mower half of FIG. 4B, with the same componentry omitted in FIG. 5A again omitted.

FIG. 5C is a side elevational view of the isolated mower half of FIG. 4C, with the same componentry omitted in FIG. 5A again omitted.

FIG. 5D is a side elevational view of the isolated mower half of FIG. 4D, with the same componentry omitted in FIG. 5A again omitted.

FIG. 7A is a front elevational view of another pair of drive control levers in assembled relation to a variant of the brake control linkages shown in FIGS. 3 to 6.

FIG. 7B is a side elevational view of the drive control levers and brake control linkage of FIG. 7A.

FIG. 8 is a front elevational view similar to FIGS. 6A and 6B, but showing a second variant of the brake control linkages that feature the addition of a spring-biased cam follower and position detection switch to each brake control linkage.

FIG. 9 is an enlarged fragmentary view showing a portion of FIG. 8 at larger scale.

FIG. 10 is an isolated plan view of a bell crank from one of the two brake control linkages of FIGS. 8 and 9.

DETAILED DESCRIPTION

Figure 3A:
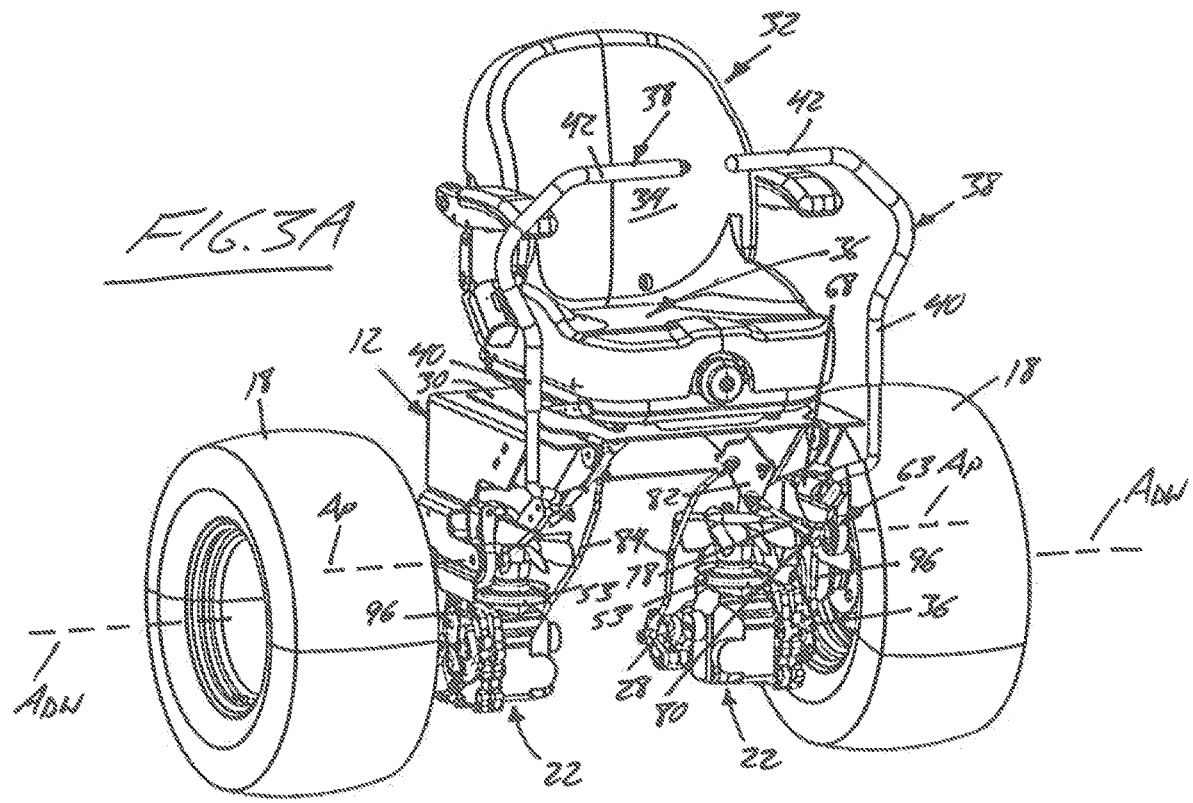
FIG. 3A is a front side perspective view of the isolated mower half of FIG. 2, with the schematic lever-constrain brackets removed, and showing the drive control levers in longitudinally neutral and laterally inboard positions, corresponding to a static but ready state of the mower, with parking brakes thereof disengaged.
Figure 3B:
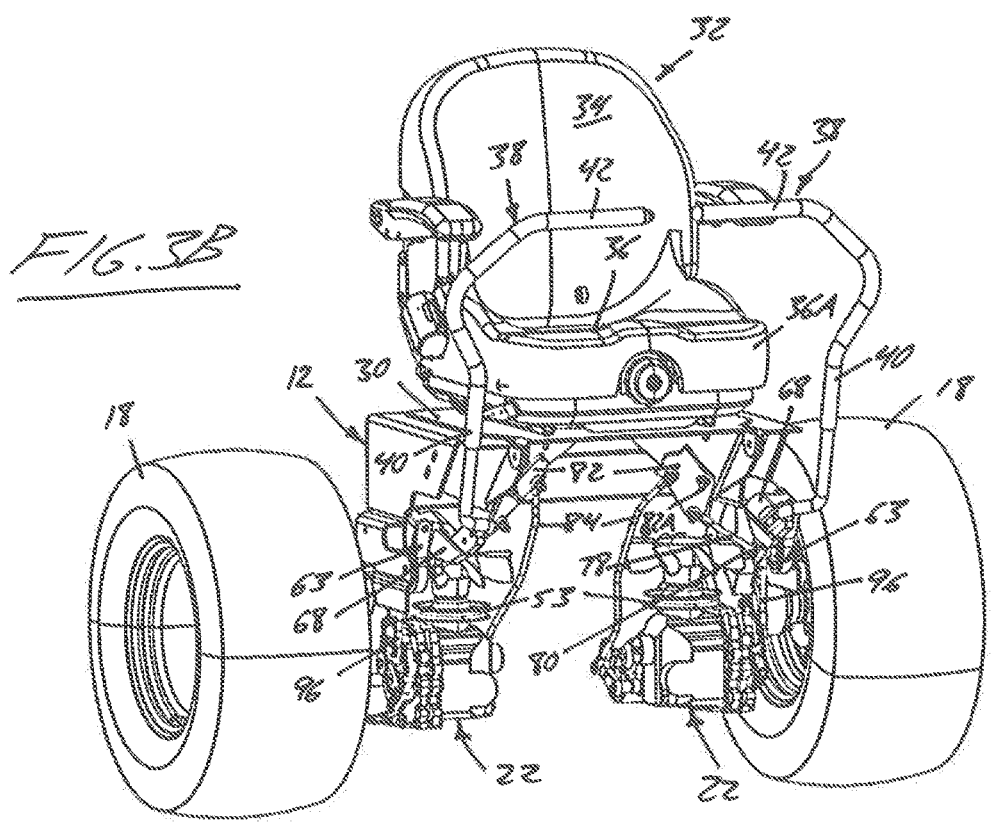
FIG. 3B is another front side perspective view of the isolated mower half of FIG. 3A, but with the drive control levers in longitudinally forward and laterally inboard positions corresponding to forward locomotive travel of the mower.
Figure 3C:
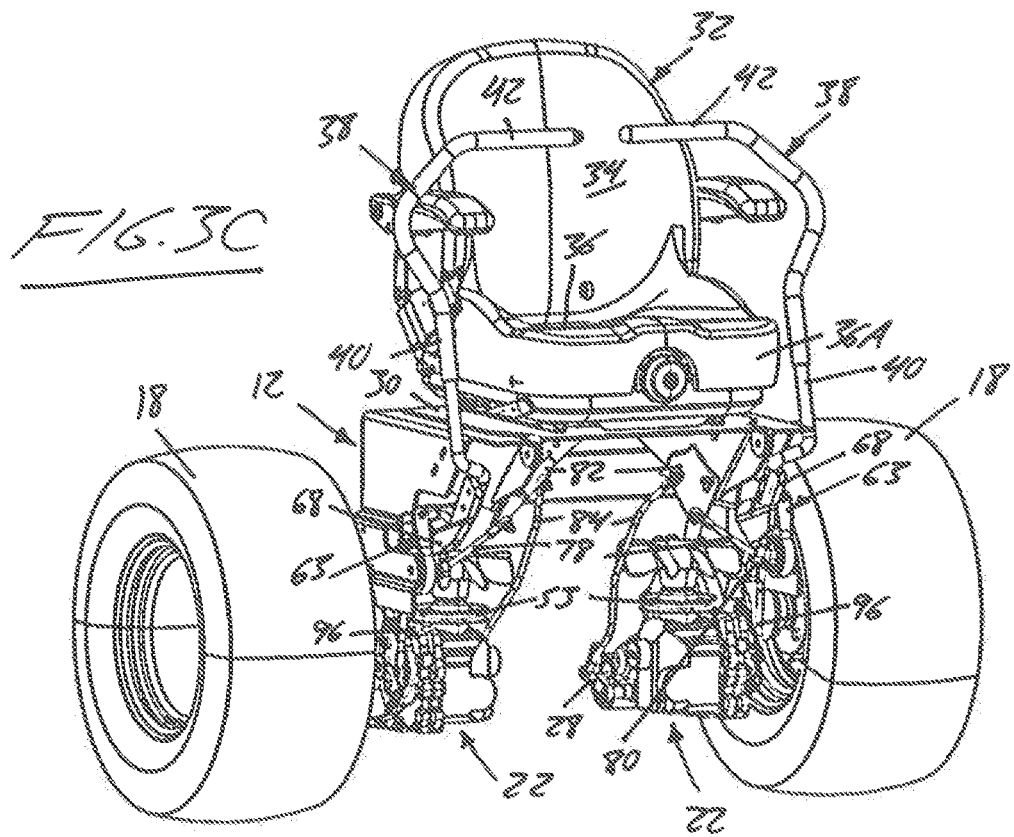
FIG. 3C is another front side perspective view of the isolated mower half of FIG. 3B, but with the drive control levers in longitudinally rearward and laterally inboard positions corresponding to a rearward locomotive travel of the mower.

FIG. 1 illustrates a zero-turn ride-on mower as a non-limiting example of a zero-turn ride-on work machine 10 in which the inventive parking brake control design of the present invention may be employed. The machine 10 has a frame 12 of elongated character between a front end 14 of the frame and a rear end 16 thereof that lies distally opposite of the front end 14 in a longitudinal direction of the machine denoted by axis do. This longitudinal direction is one of two horizontal reference directions used herein, of which the other is a lateral direction lying perpendicularly transverse to the longitudinal direction, as denoted by axis du. A rear half of the machine includes two drive wheels 18 rotatably supported at opposing lateral sides of the frame 12, for driven locomotion and steering of the machine 10 via driven rotation of said drive wheels 18, which cooperate with a set of front caster wheels for rolling ground support of the machine. As is well understood in the field of zero-turn work machines, and also briefly summarized in the foregoing background, the two drive wheels 18 are each capable of driven rotation in both directions, and may be selectively driven at the same or different speeds, and in the same or opposing direction, to one another, thereby allowing the various states of machine travel described above in said background. The two drive wheels 18 are hydraulically driven by two respective hydrostatic transaxles 22, each of which embodies, in a singular combined unit, a hydraulic pump, a hydraulic motor driven by that pump, and a gear train by which driven rotation of a motor driveshaft of the hydraulic motor is transferred to an axle shaft, the last of which denotes a final driven output of the transaxle 22 on which a wheel hub 24 is provided for mounted receipt of the respective drive wheel 18.

The axle shaft projects laterally outward from an outboard side of the transaxle 22 near a rear end thereof. One the same outboard side of the transaxle 22, at a location situated forwardly of the axle shaft and its installed wheel hub 24, features a swashplate control arm 26 of the transaxle 22, which is rotatable about a laterally oriented swashplate control axis of parallel relation to a drive wheel axis about which the axle shaft, wheel hub 24 and drive wheel 18 are rotatable. Movement of this swashplate control arm 26 is operable vary the tilt direction and tilt angle of a reversibly tiltable swashplate inside the pump of the transaxle 22, and thereby control the speed and direction of the motor of that same transaxle. At a laterally opposing inboard side of the transaxle, a brake control arm 28 is likewise pivotable about a laterally oriented brake control axis of parallel relation to the swashplate control axis, and via a cam-style action, actuates an internal disc brake of the transaxle, which serves as a parking brake of this transaxle's respective drive wheel 18. One non-limiting example of a hydrostatic transaxle of the type described herein is the ZT-4400™ hydrostatic transaxle from Hydro-Gear, to which reference may be made for a more detailed understanding of the inner workings of the transaxle, but which are not essential to the enablement of the present invention, and are therefore omitted in greater detail herein.

The primary focus of the present invention is the means of effecting control of the brake control arm 28 of each hydraulic transaxle using a same respective one of the machine's two drive control levers used to effective control of the swashplate control arm 26, whereby that drive control lever is operable to both control the rotational speed and direction of the respective drive wheel 18 through the swashplate control arm 26, and also control engagement and disengagement of the parking brake through the brake control arm 28, specifically when the swashplate control arm 26 is in a neutral position that corresponds to a neutral (zero-tilt zero-displacement) position of the swashplate, in which no power is transmitted to the respective drive wheel 18

The two transaxles 22 are embodied in the rear half of the machine between the two drive wheels 18, in underlying relation to an operator platform 30 of the frame, atop which there is carried a driver's seat 32, whose seat back 34 may reside near, or be intersected by, a vertical plane containing the wheel axes of the two drive wheels 18, and whose seat base 36 projects forwardly from a bottom of the seat back 34. Near a front end 36A of the seat base 36, and on laterally opposing sides thereof, the machine's two drive control levers 38 stand erect from the frame 12 of the machine at the laterally opposing outer sides thereof. The visibly exposed majority of each drive control lever 38, referring to the fraction thereof of exposed relation outside and above the frame 12 and operator platform 30, is of inverted L-shape, having an upright segment 40 that first stands upright from the frame 12 beside the operator platform 30, and a handle segment 42 that turns laterally inward from a top end of the upright segment 40 toward a vertical longitudinal midplane of the machine. The handle segment 42 is thus suitably positioned for manipulation in a respective hand of a driver, when seated in the driver's seat 32 atop the operator platform 20.

As mentioned above, the term longitudinal, except in any instances where it may be stated otherwise, is used herein to refer to a horizontal directionality in which front and rear ends 14, 16 of the machine 10 are spaced apart, while the term lateral refers to a horizontal directionality lying perpendicularly transverse to the longitudinal direction. The longitudinal direction thus corresponds to straight travel of the machine when both drive wheels are driven in the same rotational direction at the same speed, whereas the lateral direction refers to that in which the drive wheels 18 are space apart from one another. Except in any instances where it may be stated otherwise, the terms front, rear, forward, rearward, etc. refer to relative positions in the longitudinal direction, and the terms inward, outward, inboard, outboard, etc. refer to relative positions in the lateral direction, with inboard and inner denoting a relatively proximal relation to the longitudinal midplane that vertically and longitudinally bisects the frame midway between the lateral outer sides thereof, and outboard and outer denoting a comparably distal relation to that longitudinal midplane.

Figure 3D:
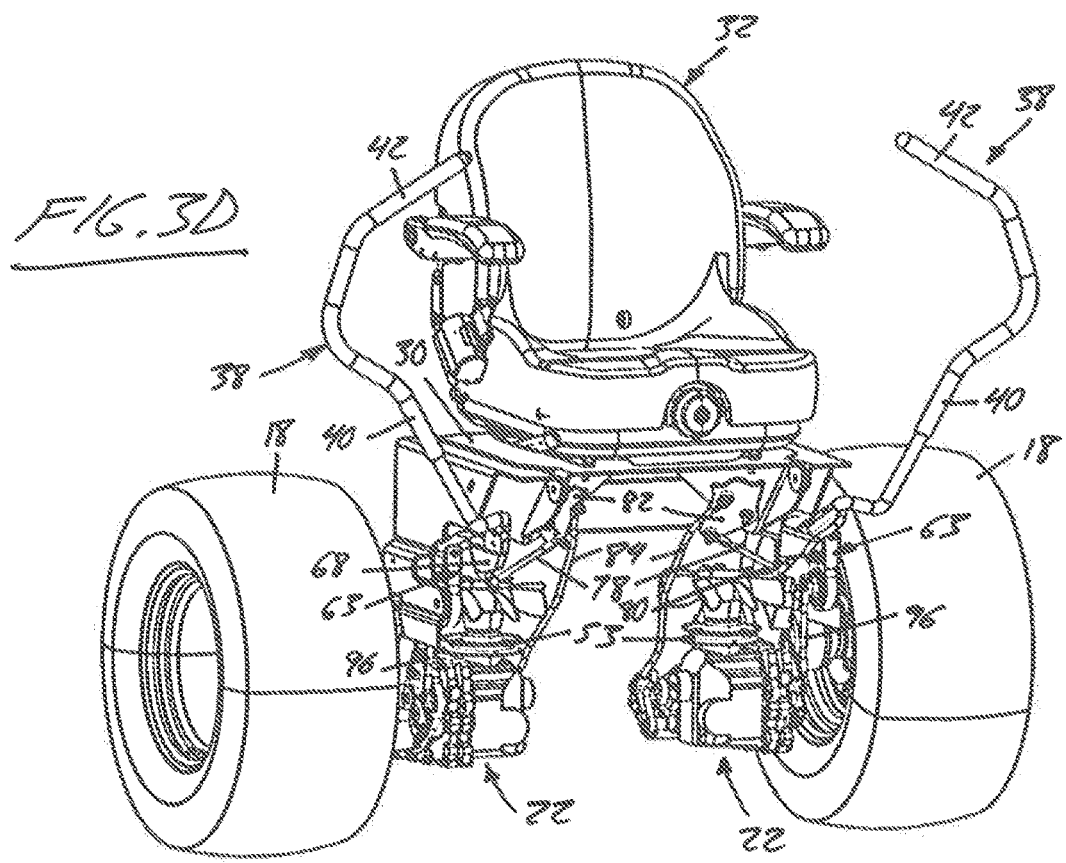
FIG. 3D is another is another front side perspective view of the isolated mower half of FIG. 3C, but with the drive control levers in longitudinally neutral and laterally outboard positions corresponding to a parked state of the mower, with the parking brakes thereof engaged.
Figure 4A:
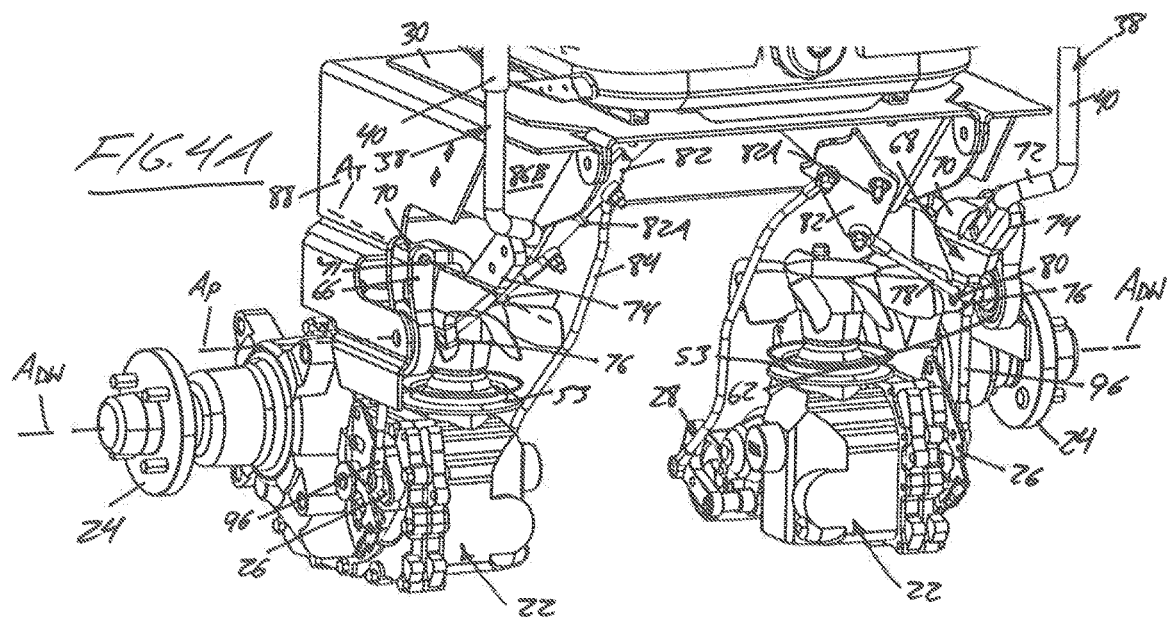
FIG. 4A is a partial closeup of the isolated mower half of FIG. 3A with drive wheels thereof removed for illustrative purpose.
Figure 4B:
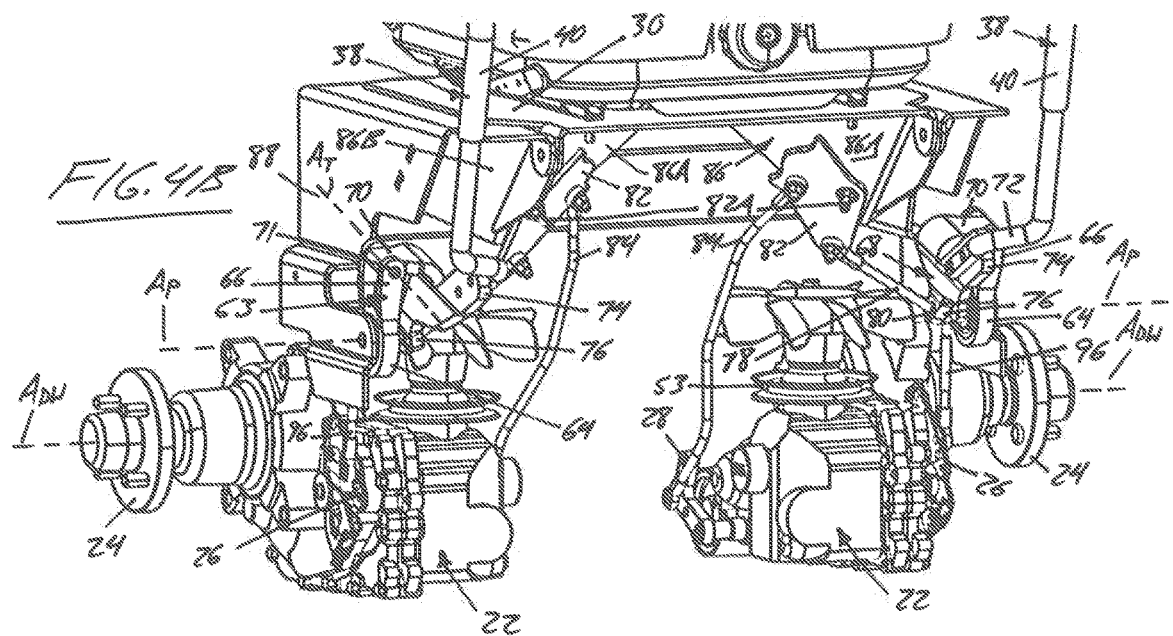
FIG. 4B is a partial closeup of the isolated mower half of FIG. 3B with the drive wheels thereof again removed for illustrative purpose.
Figure 6A:
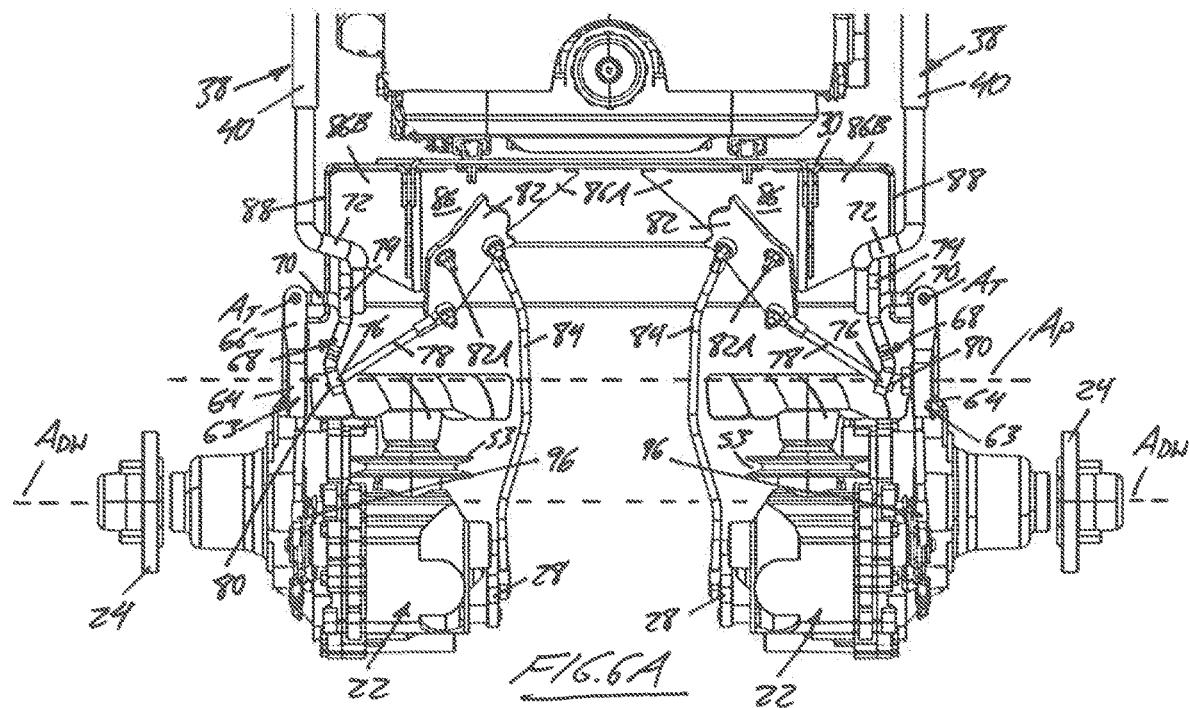
FIG. 6A is a front elevational view of the isolated mower half of FIG. 4A.
Figure 6B:
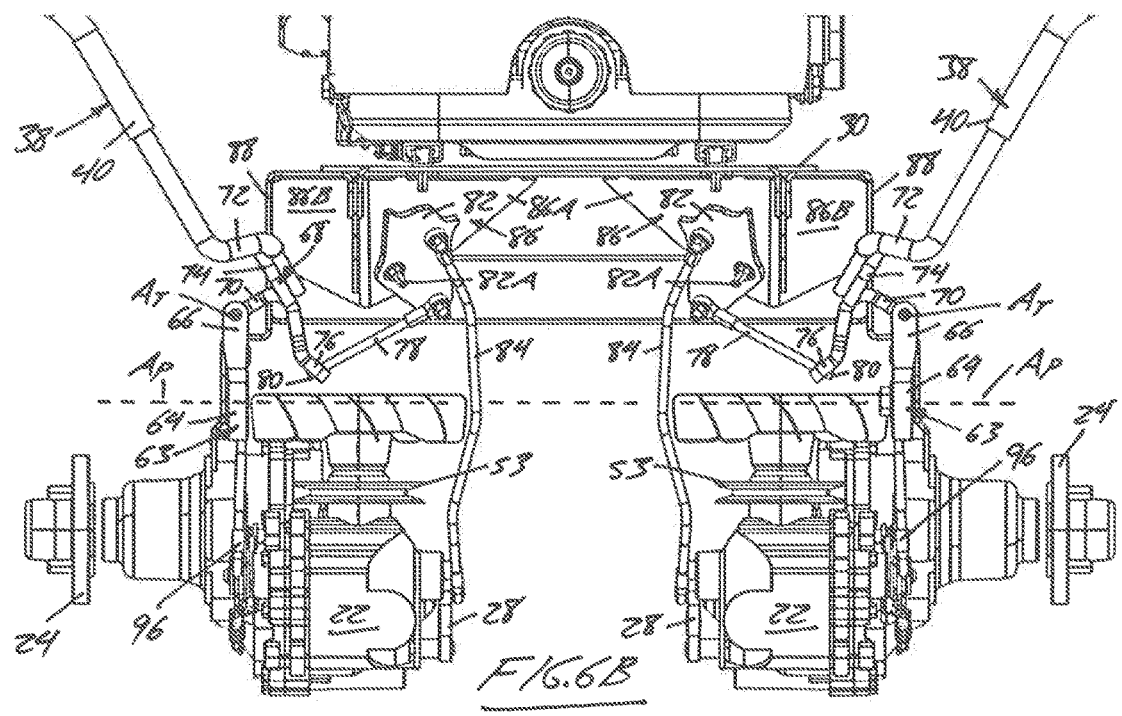
FIG. 6B is a front elevational view of the isolated mower half of FIG. 4D.

Each control lever 38 is pivotable longitudinally (forward and rearward) about a lateral pivot axis to control the rotational direction and speed of the corresponding drive wheel 18 on the same side of the frame 12 via manipulation of the swashplate control arm 26 of the respective hydraulic transaxle 22, via a connection thereto that is described in more detail below. Each control lever 38 is also laterally tiltable about an axis lying longitudinally of the machine, between an inboard driving position (FIGS. 1, 2, 3A-3C & 4A-4C), in which the upright segments 40 of the control levers 38 reside in generally vertical and parallel planes running longitudinally of the frame 12 at the laterally opposing sides thereof, such that the in-turned upper handle segments 42 reside directly in front of the driver's seat 32 for drive-control manipulation thereof by the driver, and an outboard position (FIGS. 3D & 4D), in which the drive control levers 38 are tilted laterally outward from the normal driving position to place the lower upright segments 40 of the control levers 38 in outwardly inclined planes of upwardly divergent relation to one another, thereby opening up a larger space between the upper handle segments 42 of the control levers in front of the driver seat to enable the driver to maneuver more easily into and out of the driver seat 24.

Such laterally outward tilting of each control lever 38 to the outboard position is only permitted in a longitudinally neutral position of the control lever's longitudinal pivot range, which corresponds to the neutral swashplate position of the pump of the respective transaxle 22, and thus also to an unpowered static state of the respective drive wheel 18. In the illustrated example of FIG. 2, constraint over each control lever's permitted degree of longitudinal pivoting and lateral tilting, and limitation of the lateral tilting capability of the control lever 38 to only the longitudinally neutral pivot position, is imparted by a T-slotted lever constraint bracket 44 affixed to the respective lateral side of the frame 12. Each lever constraint bracket 44 has a T-shaped guide slot 46 penetrating vertically therethrough, of which a pivot branch 48 of the guide slot 46 runs longitudinally of the machine, while a tilt branch 50 of the guide slot 46 runs laterally of the machine, and perpendicularly intersects the pivot branch 48 at a longitudinal midpoint thereof. The upright segment 40 of each control lever 38 passes upwardly through the guide slot 46 from below the bracket 44. In the longitudinally neutral position of each control lever 38, the upright segment 40 thereof resides at the intersection point of the guide slot's two branches 48, 50, from which the control lever 38 can thus be tilted laterally outward to the outboard position within the tilt branch 50 of the guide slot 46, and in doing so, can engage the parking brake of the respective transaxle, via a novel brake control linkage described in more detail below.

While situated in the tilt branch 50, the control lever 38 is blocked from any longitudinal pivoting, and is constrained to only the lateral tilting movement between the inboard and outboard positions. To disengage the parking brake of the respective transaxle, the control lever 38 is tilted back into the pivot branch 48, inside of which longitudinal pivoting of the control lever 38 is permitted both forwardly and rearwardly from the longitudinally neutral pivot position, in order to effect forward driving of the respective drive wheel 18 when pivoted forwardly toward the terminal front end of the pivot branch 48, and to effect reverse driving of the respective drive wheel 18 when pivoted rearwardly toward the terminal rear end of the pivot branch 48. At any point in the pivot branch 48, other than in the neutral position at the intersection of the two branches of the guide slot 46, lateral tilting of the control lever 38 is prevented, thereby preventing actuation of the parking brake of the respective drive wheel when said drive wheel is being driven in either rotational direction by the respective transaxle 22. The particular structure in which the guide slot 46 or similar constraint of the control lever is imparted to allow lateral tilting in only the longitudinally neutral position may vary from the particular bracket shape or bracket position shown in the illustrated example.

Turning momentarily to the front half of the machine in FIG. 1, two caster wheels 52 are installed at two front corners of the frame 12 that are of laterally opposing relation to one another, and longitudinally distant relation to the rear half of the machine where the drive wheels 18, transaxles 20, driver's seat 32 and control levers 38 are embodied. The rear half of the machine 10 will typically also include an internal combustion engine (not shown) installed in an engine bay behind the driver's seat 32 to serve as a prime mover of the machine 10, from which the pumps of the two transaxles are powered via belted transmission (not shown) running from the engine to belt pulleys 53 that are provided on pump shafts of the transaxles 22, and can be seen in later figures. Running rearwardly from each of the two caster-wheeled front corners, the front half of the frame 12 features two side rails 54 of laterally opposing relation to one another that run longitudinally of the frame 12. Delimited between these side rails 54 at a topside of the frame, but at a lesser elevation than the driver platform occupied by the driver's seat, is a footwell 56 for receiving the feet of the driver, when seated in the driver seat 32 of the machine's rear half. As shown, the footwell may be of recessed elevation relative to the topsides of the frame's side rails 54. For operator comfort, the footwell 56 may comprise one or more forwardly inclined footrests 58 at or near a front terminus of the footwell 34.

In the illustrated example of the work machine 10, the working implement thereof is an undermounted mower implement 60 mounted, in adjustable elevation, to the front half of the frame 12 in a position residing beneath the side rails 54 and footwell 56 thereof, and residing rearwardly of the front caster wheels 52 so as to ride in trailing relation thereto during forward locomotive travel of the machine 10. The mower implement 60 thus resides beneath the frame of the machine 12 in a longitudinally mid position residing between the front caster wheels 52 and the rear drive wheels 18. This mid-mount mower context is just one non-limiting example of one type of working machine in which the inventive aspects of the disclosed invention may be employed, and other zero-turn machines of varying implement type and implement location may likewise benefit from any or all inventive aspects of the disclosed invention.

Having now fully set forth one non-limiting example of an operating context for parking brake and swashplate control of the two transaxles 22 via manual movement of the two control levers 38, attention is now turned to the manner in which the control levers 38 are supported, and details of the mechanical interconnections thereof to the swashplate control arms 26 and brake control arms 28 of the two transaxles 22. The laterally oriented pivot axis $A_P$ about which each control lever 38 is longitudinally pivotable (referred to as the lever pivot axis, for short) is defined by the rotational axis of a respective bearing 62, whose inner race is affixed to the respective lateral outer side of the frame. In side elevational view of the machine from the side of the machine to which the bearing 62 is mounted, and with reference to a circular wheel-based reference frame centered on the drive wheel axis $A_{DW}$ of the respective drive wheel 18, the lever pivot axis $A_P$ resides in a front upper quadrant of that wheel-based reference frame, i.e. between nine o'clock and twelve o'clock relation to the drive wheel axis, at a radial distance nearer to the outer tire circumference of the drive wheel 18 than to the central drive wheel axis of the drive wheel 18.

A pivot member 63 features a round collar 64 that circumferentially encapsulates an outer race of the bearing 62 in rotationally affixed relation thereto to allow rotation of this pivot collar 64 around the inner race of the bearing, whereby the pivot member 63 is rotatably journaled about the lever pivot axis $A_P$. The pivot member 63 further includes an upstanding crank arm 66 affixed thereto and whose angulation about the lever pivot axis $A_P$ is variable within the two upper quadrants of the bearing's circumference, and which angulation is varied by manipulation of the respective control lever 38. In the illustrated example, the crank arm 66 is a bifurcated arm composed of two parallel prongs, and this crank arm 66 stands straight upward in twelve o'clock relation to the lever pivot axis $A_P$ in the longitudinally neutral position of the control lever 38. From this neutral twelve o'clock position, with the respective control lever 38 in the pivot branch of the T-shaped slot, the crank arm 66 can be pivoted into a forward inclination from the neutral twelve o'clock position via driver's forward pushing of the control lever 38, or pivoted into a rearward inclination neutral twelve o'clock position via the driver's rearward pulling of the control lever 38. A tilt bracket 68 has a rear upper mounting arm 70 that is hinged to the crank arm 66 near a terminal upper end thereof of distal relation to the bearing 62. The hinged coupling is provided by a hinge pin 71 that penetrates through the bifurcated crank arm 66 and through the tilt bracket's mounting arm 70 is received between the two prongs of the bifurcated crank arm 66. In an alternative embodiment, the crank arm may be a singular projection, the rear upper mounting arm 70 of the tilt bracket 68 may instead be bifurcated into two prongs respectively neighbouring front and rear side of the non-bifurcated crank arm 66. In either case, it is this hinged coupling that defines a tilt axis $A_T$ that is oriented longitudinally of the vehicle when the control lever is in its longitudinally neutral position, about which the respective control lever 38 is laterally tiltable between the inboard and outboard positions when in such longitudinally neutral position. Below the constraint bracket 44, the control lever 38 has a goosenecked mounting portion 72 that turns laterally inward from the constraint bracket 44, and then turns rearwardly for attachment to the tilt bracket 68 at a front support lobe 74 thereof that protrudes forwardly from the rear upper mounting arm 70, for example at an upwardly inclined angle thereto, at an inner side of the pivot member 63.

The tilt bracket 68, below the rear upper mounting arm 70 and front support lobe 74 thereof, also has a lower coupling lobe 76 residing at a lesser elevation than said mounting arm 70 and support lobe 74. At this lower coupling lobe 76, the tilt bracket 68 has coupled thereto, via a ball joint 80, one end of a rigid lever connection link 78 of fixed length. This ball joint 80, at any time when the control lever 38 is in the inboard position, and regardless of where the control resides in the pivot branch 48 of the guide slot 46, resides on, and is therefore intersected by, the lever pivot axis $A_P$. The purpose of this lever connection link 78 is to connect the tilt bracket 68 to a respective bell crank 82, from which another rigid link of fixed length, distinctively referred to as a brake connection link 84 to differentiate it from the lever connection link 78, then runs to the brake control arm 28 of the respective transaxle 22 on the same side of the machine 10. The bell crank 82 occupies an inclined plane that slopes elevationally upward from rear to front in the longitudinal direction, and slopes longitudinal rearward from outside to inside in the lateral direction. At a rotational support point 82A, the bell crank 82 is rotatable about a bell crank rotation axis of orthogonal relationship to the plane of the bell crank 82, whereby this bell crank rotation axis has an inclined slope in both longitudinally rearward relation to the machine and laterally outward relation thereto.

Each bell crank 82 is rotatably coupled to a mounting plate 86 that, at least at the area thereof of neighbouring and coupled relation to the bell crank 82, occupies another inclined plane of adjacent and parallel relation to that of the bell crank 82. This mounting plate 86 is of fixed relation to the frame 12 and underlying relation to the driver platform 30 and driver seat 32 near the front end 36A of the seat base 36 thereof. In the illustrated example, the mounting plate 86 is a bent plate having an inner half 86A (used in a general sense to mean one of two constituent parts of a whole, and not necessarily a precise 50% measure of that whole) residing nearer to the longitudinal midplane of the machine, and an outer half 86B residing nearer to the respective lateral outer side of the machine. The inner half 86A supports the bell crank 82, and resides in parallel relation to the plane thereof, and the outer half 86B diverges from the inner half at a bent front apex of the mounting plate 86. The outer half 86B spans laterally outward and rearward therefrom its apexed meeting with the inner half 86A, to a pointed of attachment with the respective lateral side of the frame 12. In the illustrated example, the inner half 86A of the bent mounting plate has a tabbed upper edge whose tabs mate with matching slots in an underside of the driver platform 30, and the outer half 86B of the bent mounting plate 86 has a tabbed outer edge whose tabs mate with matching slots in a lateral outer sidewall 88 of the frame 12, which sidewall 88 denotes the lateral outer side of the frame 12 in the illustrated frame example, lower down on which the respective bearing 62 is installed.

The illustrated bell crank 82 is a flat plate on which connection of the lever and brake connection links 78, 18 and the bell crank's rotational support point 82A each reside near an respective outer corner of the plate's outer perimeter. More specifically, the rotational support point 82A of the bell crank 82 resides adjacent a mid outside corner 83A thereof, the brake connection link 84 connects to the bell crank 82 adjacent an upper front inside corner thereof, and the lever connection link 78 connects to the bell crank 82 adjacent a lower rear corner 83B thereof. An inner end of the lever connection link 78, and a front end of the brake connection link 84, are each coupled to the bell crank 82 via a respective ball joint. The rear end of the brake connection link 84 also connects to the brake control lever 28 of the hydraulic transaxle 22 via another respective ball joint, just like the ball joint connection of the lever connection link 78 to the tilt bracket 68. Each connection link 78, 84 of coupled relation to the bell crank 82, being equipped with ball joints at both of its ends, can thus undergo rotation about three orthogonal axes at each of its ends to accommodate relative movement between the various components. Of the bell crank's rotational support point 82A and the respective connection points thereon of the lever and brake connection links 78, 84, the bell crank's rotational support point 82A is frontmost of the three and resides at an intermediate elevation between the other two, the lever link connection point is a rearmost of the three and resides at a lowest elevation of the three, and the brake link connection point is a frontmost of the three and resides at a greatest elevation of the three.

On each lateral half of the machine (i.e. on each side of the longitudinal midplane thereof), the respective tilt bracket 68, lever connection link 78, bell crank 82 and brake connection link 84 cooperatively form a respective brake control linkage by which the respective control lever 38 is connected to the brake control arm 28 of the respective transaxle 22 to engage and disengage the parking brake thereof via laterally outward and laterally inward tilting of the respective control arm 38 between its inboard and outboard positions when in the longitudinally neutral position. The lever connection link 78 runs a short distance laterally inward and elevationally upward from the lower coupling lobe 76 of the tilt bracket to the bell crank 82, and because the ball joint 78A that couples the lever connection link's outer end to the tilt bracket 68 resides directly on the lever pivot axis $A_P$, the lever connection link 78 does not pivot the bell crank 82 at any time during longitudinal pivoting of the control lever 38 in the guide slot 46. During such longitudinal pivoting of the control lever 38, the tilt bracket 68 moves in synchronous concert with both the control lever 38 and the pivot member 63, in single-axis pivotal fashion about the lever pivot axis $A_P$ of the bearing 62, without undergoing any tilting movement relative to these components about the tilt axis $A_T$ between the tilt bracket 68 and the pivot member 63. During this synchronously matching movement of the control lever 38, tilt bracket 68 and pivot member 63 about the lever pivot axis $A_P$, the ball joint that couples the tilt bracket 68 and the lever connection link 78 accommodates rotation of the tilt bracket 68 relative to the lever connection link 78, without causing any displacement of that link 78, owing to the ball joint's position directly on the lever pivot axis $A_P$ about which the other components are pivoting.

The inboard position of the control lever 38 corresponds to a brake-release position of the brake control arm 28 of the transaxle 22, in which the parking brake thereof is disengaged, whereby the lack of ball crank movement during longitudinal pivoting of the control lever 38 means that the parking brake remains disengaged during such control lever movement. Only when the control lever 38 is tilted laterally outward from the longitudinally neutral position by the driver does the lever connection link 78 undergo any displacement. At this time, the lever connection link 78 experiences an elevationally upward and laterally inward swinging of its outer end about the tilt axis $A_T$ of the hinged connection between the tilt bracket 68 and the pivot member's crank arm 66. This forces the opposing inner end of the lever connection link 78 elevationally upward and laterally inward, thereby driving rotation of bell crank 82 about its rotation axis in a direction forcing the front end of the brake connection link 84 elevationally upward, longitudinally forward and laterally outward. This crank-driven movement of the brake connection link's front end causes its rear end to be pulled elevationally upward and longitudinally forward, thus rotating the brake control arm 28 of the transaxle 22 forwardly into the brake-engaging position engaging the parking brake of the transaxle 22.

To disengage the parking brake, the driver tilts the control lever 38 laterally inward from the outboard position back to the inboard position, causing an elevationally downward and laterally outward swinging of the lever connection link's outer end about the tilt axis $A_T$ of the hinged connection between the tilt bracket 68 and the pivot member's crank arm 66, back into an aligned position with the lever pivot axis $A_P$. This pulls the opposing inner end of the lever connection link 78 elevationally downward and laterally outward, thereby driving rotation of the bell crank 82 about its rotation axis in a reverse direction forcing the front end of the brake connection link 84 elevationally downward, longitudinally rearward and laterally inward. This crank-driven movement of the brake connection link's front end causes its rear end to be pushed elevationally downward and longitudinally rearward, thus rotating the brake control arm 28 of the transaxle 22 rearwardly into the brake-release position disengaging the parking brake 22 of the transaxle.

So that the longitudinal pivoting of each control lever 38 in the inboard position thereof is operable to vary the swashplate position of the respective transaxle 22 to thereby control the rotational speed and rotational direction of the respective drive wheel 18, the pivot member 63 features a rear coupling bracket 92 that cantilevers rearwardly from the pivot collar 64, as can be seen in FIGS. 5A through 5D. An upper end of a rigid swashplate connection link 96 of fixed length is pivotably coupled to this rear coupling bracket 92 of the pivot member 63. Meanwhile, a lower end of the swashplate connection link 96 is pivotably coupled to the swashplate control arm 26 of the transaxle 22. Forward pivoting of the control lever 38, from the longitudinally neutral position, pivots the pivot member 63 forwardly, via the tilt bracket 68 that serves as an intermediary therebetween, thereby lifting the coupling bracket 92 at the rear of the pivot collar 64, and thus pulling upward on the swashplate control arm 26 via the swashplate connection link 96. This tilts the pump swashplate out of its neutral position into a forward-driving direction that causes driven forward rotation of the respective drive wheel 18. Rearward pivoting of the control lever 38, from the longitudinally neutral position, instead pivots the pivot member 63 rearwardly, again via the tilt bracket 68 coupled therebetween, thereby lowering the coupling bracket 92 and thus pushing downwardly on the swashplate control arm 26 via the swashplate connection link 96. This reversely tilts the pump swashplate out of its neutral position, into a rearward-driving direction to effect rearwardly driven rotation of the respective drive wheel 18.

FIGS. 7A and 7B schematically illustrate a variant of the brake control linkages, in which the bell cranks 82' once again occupy inclined planes sloped elevationally upward from rear to front in the longitudinal direction, and sloped longitudinal rearward from outside to inside in the lateral direction, but differ in terms of where the lever and brake connection links 78', 84' connect to the bell cranks 82 relative to the rotational support points 82A' thereof, and in terms of the directionality effected on the brake control arms 28 of the two transaxles 22. In the FIG. 7 variant, in which the bell cranks are generally triangular in shape, each thus having an outer perimeter characterized by three corners, the lever connection link 78' of each brake control linkage connects to the bell crank 82' adjacent an upper front outside corner thereof, the brake connection link 84' connects to the bell crank 82' adjacent an upper inside corner thereof, and the rotational support point 82A' of the bell crank resides at a rearmost corner thereof of rearward and laterally intermediate relation to the bell crank connections points of the two connection links 78', 84'. In this variant, when the drive control lever 38' is tilted laterally outward to the outboard position, the lever connection link 78 again experiences an elevationally upward and laterally inward swinging of its outer end about the tilt axis $A_T$ of the control lever 38, and an associated upward and laterally inward forcing of its crank-connected inner end.

In this variant, the resulting rotation of the bell crank 82 is in a direction forcing the front end of the brake connection link 84' elevationally downward, longitudinally rearward and laterally outward, causing the rear end of the brake connection link 84' to be pushed elevationally downward and longitudinally rearward, thus rotating the brake control arm 28 of the transaxle 22 rearwardly into a brake-engaging position engaging the parking brake of the transaxle 22. While the rotational directionalities of bell crank 82' and brake control arm 28 in this variant are reverse to those of the earlier illustrated example, both variants of the brake control linkage share the common geometry of a lever connection link 78 whose ball-jointed outer end 80 lies directly on the pivot axis $A_P$ of the drive control lever 38' in the inboard position of, and throughout the longitudinal pivot range of, the drive control lever 38'. In each variant, the result is that the bell crank of obliquely inclined orientation is only rotated during lateral tilting of the drive control lever, and not during longitudinal pivoting thereof, enabling engagement and disengagement of the parking brake via such lateral tilting. The second variant also illustrates one non-limiting example of optional variation in the design of the tilt bracket 68' by which the ball joint 80 at the outer end of the lever connection link 78' is offset downwardly from the tilt axis $A_T$ to lie coincident with the pivot axis $A_P$ in the inboard position of the drive control lever 38'. In FIGS. 7A and 7B, details of the hinged connection of the tilt bracket 68' to the pivot member via a crank arm thereof are omitted to avoid obstructive cluttering of the figures. Such details may vary in a variety of ways, without departure from the inventive concepts disclosed herein.

FIGS. 8 and 9 show a second variant of the brake control linkages of FIGS. 3 to 6, which second variant is described primarily in terms of features thereof that distinguish it from the brake control linkages of FIGS. 3 to 6. Aside from the described differences, the brake control linkages of this second variant may otherwise be identical to those shown in FIGS. 3 to 6, and described above in relation thereto, whereby any singular feature, or combination of features, described above in relation to FIGS. 3 to 6 may be combined with any singular feature, or combination of features, described below in relation to FIGS. 8 through 10, and vice versa, within the scope of the present invention. The second variant is described with particular focus on the bell cranks 82" of the two brake control linkages, which in this variant, serve not only to transform the lateral movement of the drive control levers 38 into engagement and disengagement of the parking brakes (in identical fashion to the forgoing description made in relation to FIGS. 3 to 6), but also serve as both camming components for imparting physical resistance to lateral tilting of the drive control levers out of both its inboard and outboard positions, and as switch actuators for actuating position detection switches used in a safety interlock circuit of the mower. Other variants may alternatively use the bell crank for only a singular one of either such cam-based tilt resistance for the drive control levers, or the actuation of position detection switches, within the scope of the present invention.

As described earlier in relation to FIGS. 3 to 6, each bell crank 82" is a flat plate, and thus has a purely uniplanar form (as opposed to a bent plate having different sections thereof occupying different respective planes). This flat uniplanar form of the bell crank denotes a more efficiently producible part compared to bent, multiplanar bell cranks used in prior art brake control linkages, where such parts require both cutting of flat plate material into the proper shape, and a subsequent bending operation to then bend the initially flat plate into its final form. Each flat-plate bell crank 82" is characterized by front and rear facial surfaces of parallel relation and matching shape and surface area to one another, and an outside perimeter edge denoting the shared outer boundary of those two matching facial surfaces. Of the two facial surfaces, front facial surface 100 is visible in the drawings. The facial character of the flat front and rear facial surfaces refers to a notably greater breadth of each such surface its two dimensions relative to the comparatively thin perimeter edge whose notably narrower breadth is measured in a third dimension of orthogonal relationship to the two dimensions of each flat facial surface. The rear facial surface of each bell crank 82" faces the respective mounting plate 86 to which the bell crank is rotatably mounted, and both the lever connection link 78 and the brake connection link 84 are coupled to the front side of the flat-plate bell crank 82". The inner end of the lever connection link 78 and the front end of the brake connection link 84 thus both reside in adjacency to the front facial surface 100 of the bell crank 82" in all three illustrated examples of the flat-plate bell cranks of uniplanar form 82, 82', 82".

The perimeter edge 102 of the bell crank 82" includes a cam-profiled edge segment 104 of undulating shape profile running from an upper front inside corner 83C of the bell crank 82", near which the front end of the brake connection link 84 is connected to the bell crank 82", to an upper front mid corner 83D of the bell crank, from which the perimeter edge 102 changes direction to join this upper front mid corner 83D to the mid outside corner 83A, near which the bell crank's rotational support point 82A resides. The undulating shape of the cam-profiled edge segment 104 includes a first concave recess 106A residing adjacent the upper front inside corner 83C of the bell crank 82", a second concave recess 106B residing adjacent the upper front mid corner 83D of the bell crank 82", and a convexly crested intermediary region 108 that is disposed between and interconnects the two recesses 106A, 106B. The crested intermediary region is of raised relation to the recesses 106A, 106B in the two-dimensional shape profile of the cam-profiled edge segment 104, as viewed from any reference plane of parallel relation to the facial surfaces of the flat-plate bell crank 82", an example of which is shown in FIG. 10. This cam-profiled edge segment 104 is also present on the bell crank 82 of earlier FIGS. 3 to 6, but in the present variant of FIGS. 8 to 10, becomes purposefully effective by accompaniment of the bell crank 82" by an adjacent cam follower 110 pivotally mounted to the same mounting plate 86 on which the bell crank 82" is rotatably supported.

The cam follower 110 features a rocker arm 112 having one end thereof journaled on a pivot pin 114 that is engaged to the inner half 86A of the mounting plate 86 in orthogonal relationship thereto, and therefore lies parallel to the bell crank rotation axis defined by the bell crank's rotational support point 82A on the same inner half 86A of the same mounting plate 86. An opposing second end of the rocker arm 112 rotatably carries a cam roller 116 thereon, whose rotation axis is likewise parallel to the pivot pin 114 and bell crank rotation axis. This cam roller 116 resides in rollable contact with the cam-profiled edge segment 104 of the bell crank's perimeter edge 102. At an intermediate point along the rocker arm 112 between its pivotally supported end and its opposing roller-carrying end, a compression spring 118 is engaged between the rocker arm 112 and a spring stop 120 mounted to the inner half 86A of the mounting plate 86 in stationary relationship thereto, whereby the compression spring 118 exerts a spring force on the rocker arm 112 in a direction biasing the cam-carrying end thereof toward the bell crank 82". This spring force biases the cam roller 116 into contact with the cam-profiled edge segment 104 of the bell crank 82". In the illustrated example, the pivotally supported end of the rocker arm 112 is an inside end thereof, meaning an end thereof of closer adjacency to the longitudinal midplane of the machine than an opposing outside end of the rocker arm, which in this case is the roller-carrying end thereof.

In FIG. 8, the drive control lever 38 at the right side of the figure (i.e. the left-hand drive control lever from the driver's perspective) is shown in its outboard braking position, while the drive control lever 38 at the left-hand side of FIG. 8 (i.e. the right-hand drive lever from the driver's perspective) is shown in its inboard driving position. As can be seen of the driver's left-hand drive control lever at the right side of FIG. 8, the cam roller 116 of the cam follower 110 is spring biased into the first recess 106A of the cam-profiled edge segment 104 of the respective bell crank 82" when the driver's left-hand drive control lever is in its outboard braking position. Though not specifically illustrated, the same is also true of the driver's right-hand drive control lever, whose outboard braking position would likewise correspond to seated receipt of the cam roller 116 in the first recess 106A of the respective bell crank 82". As can be seen of the driver's right-hand drive control lever at the left side of FIG. 8, the cam roller 116 of the respective cam follower 110 is instead spring biased into the second recess 106B of the cam-profiled edge segment 104 of the respective bell crank 82" when the driver's right-hand drive control lever is in its inboard position. Though not specifically illustrated, the same is also true of the driver's left-hand drive control lever, whose inboard driving position would likewise correspond to seated receipt of the cam roller 116 in the second recess 106B of the respective bell crank 82"

Owing to the convexly raised bulge embodied by the crested intermediate region 108 of the cam-profiled edge segment 104 between the two concave recesses 106A, 106B thereof, the spring-biased engagement of the cam follower 110 against the cam-profiled edge segment 104 of the bell crank 82" imparts a physical resistance to the rotational movement of the bell crank 82" that is involved in relocation of the cam roller 116 from one recess to the other, in either direction. This physical resistance to the rotation of the bell crank 82" translates to a corresponding physical resistance to the lateral tiling of the respective drive control lever 38, in both directions, between its inboard and outboard positions, which resistance must be overcome through application of sufficient manual force to the drive control lever 38 during such lateral transition between the inboard and outboard positions. Each drive control lever 38 will thus maintain either of the inboard and outboard positions once placed therein, and will only transition to the other one of these positions if the lever is tilted with sufficient manual force to overcome the cam-imparted resistance and impart rotation of the center apex of the crested intermediate region 108 of the cam-profiled edge segment 104 past the cam roller 116. Should the manual force on the drive control lever be released before this apex cross-over of the cam roller 116, the spring bias of the cam follower 110 will rock the bell crank 82" back to its starting position, seating the cam roller 116 back in the recess 106A 106B in which it was previously seated. This resistance mechanism denoted by cooperative relationship between the bell crank 82" and the cam follower 110 is thus operable to prevent inadvertent tilting of the drive control lever 38 between its inboard and outboard positions, using a threshold of driver-applied force to the drive control lever 38 to differentiate between intentional and unintentional movement thereof.

The spring stops 120 in the illustrated example are adjustable in position to enable adjustment of the spring force applied to the cam follower 110. Each spring stop 120 is mounted in an elongated mounting slot 122 in the inner half 86A of the respective mounting plate 86, and is lockable in place at different positions in this mounting slot 122 to vary the proximity of the spring stop 120 to the cam follower 110. A closer proximity of the spring stop 120 to the cam follower 110 achieves a more compressed state of the spring 118, and thus causes exertion of a greater spring force on the cam follower 110, thereby increasing the rotational resistance imparted to the bell crank 82". In the illustrated example, the locking and unlocking of the spring stop 120 is attributable to cooperation of a threaded male bolt 124 of the spring stop 120 with one or more threaded female nuts 126 thereof, which may include the visible nut 126 in front of the mounting plate 86, and another unseen nut therebehind. Loosening of this nut and bolt combination 124, 126 enables relocation of the spring stop 120 along the mounting slot 122 to a new position, at which retightening of this nut and bolt combination 124, 126 locks the spring stop 120 in place. In the illustrated example, the head of the bolt 124 is engaged by one end the spring 118, whereby the bolt 124 is not only part of the spring stop's adjustment mechanism, but also serves as the spring-receiving component of the spring stop 120. The other end of the spring 118 engages over a protrusive spring-receiving boss on a side of the cam follower rocker arm 112 that faces the spring stop 120 to prevent the spring 118 from disengaging from the rocker arm 112.

For use as part of a safety interlock circuit that, among other possible safety functions, prevents starting of the engine if the drive control levers 38 are not in their outboard braking positions, each brake control linkage is accompanied by a respective position-detection switch 128 that is engaged whenever the respective drive control lever 38 is in the outboard braking position. Each position-detection switch 128 is mounted to the same inner half 86A of the respective mounting plate 86 as the bell crank 82" and cam follower 110 of the respective brake control linkage, in a position closely adjacent the bell crank 82" for actuation thereby in a braking position thereof occupied thereby when the respective drive control lever is in its outboard braking position. More specifically, the position-detection switch 128 is positioned for actuation thereof by the perimeter edge 102 of the flat-plate bell crank 82", and more particularly by a switch-actuation edge segment 130 of separate and distinct relationship from the cam-profiled edge segment 104 of the bell crank's perimeter edge 102. In the illustrated example, this switch-actuation edge segment 130 resides adjacent an additional inside corner 83E of this variant of the flat-plate bell crank 82", which additional inside corner 83E was not embodied in the earlier bell crank of FIGS. 3 to 6. The position-detection switch 128 resides near the pivotally supported inner end of the respective cam follower rocker arm 112 with a plunger axis of the switch 128 at an orientation lying transversely to the rocker arm's direction of elongation. Bell crank 82" of this variant differs from those of FIGS. 3 to 6 in a reshaping of the bell crank's perimeter edge 102 between lower rear corner 83B and upper front inside corner 83C to create the additional inside corner 83E and the adjacent suitably oriented switch actuation segment 130, but otherwise has the same shape of the earlier bell crank 82 of FIGS. 3 6.

In FIGS. 8 and 9, a plunger 128A of the position-detection switch 128 at the left of the figure for detecting the inboard position of the driver's right-hand drive control lever is shown to be unengaged by the respective bell crank 82", owing to the occupied inboard position of the driver right-hand drive control lever in the illustrated instance. Meanwhile, the plunger 128A of the other position detection switch 128 at the right of the figure for detecting the inboard position of the driver's left-hand drive control lever in shown to be engaged by the switch-actuation segment 130 of the respective bell crank 82", owing to the occupied outboard position of the driver's left-hand drive control lever in the illustrated instance. As is known in the art, one or more other switches may be included in the safety interlock circuit, for example including a seat occupancy sensor for detecting presence of a driver in the driver seat, and an implement engagement switch whose status determines if the implement (e.g. mower deck) is being driven off the engine power take off (PTO) or not. Such a multi-switch safety interlock circuit can therefore be used to prevent startup of the engine, or terminate running operation of the engine, in potential dangerous scenarios detectable based on different combinates of on and off states among these multiple switches.

Since various modifications can be made in the invention as herein above described, and many apparently widely different embodiments of same made, it is intended that all matter contained in the accompanying specification shall be interpreted as illustrative only and not in a limiting sense.

The invention claimed is:

1. A ride-on zero-turn work machine comprising:
a frame;
two drive wheels rotatably supported at opposing lateral sides of the frame for driven locomotion and steering of the machine;
two caster wheels rotatably supported in respective adjacency to said opposing lateral sides of the frame in positions of leading relation to the drive wheels in a forward travel direction of the machine;
two variable flow hydraulic pumps each having an external swashplate control via which an internal swashplate of the pump is repositionable to vary output flow from said pump;
two hydraulic motors respectively installed in operative relation between the two pumps and the two drive wheels to effect driven rotation of the drive wheels using said output flow from said pumps;
a pair of drive control levers each movably supported on frame in a manner pivotable longitudinally forward and rearward, about a lateral pivot axis, from a neutral position to control a rotational direction and speed of a respective one of the drive wheels, and also laterally tiltable, in said neutral position, between an inboard driving position, and an outboard braking position tilted laterally outward therefrom;
two parking brakes of respectively operable relation to the two drive wheels, and actuable between locked states preventing rotation of said drive wheels and unlocked states allowing rotation of said drive wheels;
two brake control linkages, each connected between a respective one of the drive control levers and a respective one of the parking brakes, each of said brake control linkages comprising:
a bell crank movably mounted to the frame for rotatable movement relative thereto about a rotational support point;
a lever connection link having a first end coupled to the bell crank, and a second end coupled to a respective one of the drive control levers;
a brake connection link having a first end coupled to the bell crank, and a second end coupled to the respective one of the parking brakes;
a cam provided on a first one of either the frame or the bell crank; and
a cam follower provided on a second of either the frame or the bell crank at a location adjacent the cam and biased into engagement therewith;
wherein a shape profile of the cam of each brake control linkage comprises a first recess whose relative location within said shape profile is one occupied by the cam follower when the respective one of the drive control levers is in the outboard braking position, a second recess whose relative location within said shape profile is one occupied by the cam follower when the respective one of the drive control levers is in the inboard driving position, and an intermediary region that is disposed between said first and second recesses and is of raised relation thereto within said shape profile so as to, via contact between the cam follower and said intermediary region, impart physical resistance to rotation of the bell crank during transition of the respective one of the drive control levers between the inboard driving position and the outboard braking position, which resistance must be overcome via manual urging of the drive control levers with sufficient force to overcome said resistance.

2. The work machine of claim 1 wherein the cam of each drive control linkage is provided on the bell crank, and the cam follower of each drive control linkage is provided on the frame.

3. The work machine of claim 2 wherein the cam of each drive control linkage is embodied in a profiled edge of the bell crank itself.

4. The work machine of claim 3 wherein said profiled edge is part of an outside perimeter edge of the bell crank.

5. The work machine of claim 4 further comprising a position detection switch positioned for engagement thereof by said outside perimeter edge of the bell crank when the respective one of the drive control levers is in one of said inboard driving and outboard braking positions.

6. The work machine of claim 5 wherein said position detection switch is positioned for engagement thereof by the outside perimeter edge of the bell crank when said respective one of the drive control levers is in the outboard braking position.

7. The work machine of claim 1 wherein the bell crank is a flat plate of uniplanar form.

8. A ride-on zero-turn work machine comprising:
a frame;
two drive wheels rotatably supported at opposing lateral sides of the frame for driven locomotion and steering of the machine;
two caster wheels rotatably supported in respective adjacency to said opposing lateral sides of the frame in positions of leading relation to the drive wheels in a forward travel direction of the machine;
two variable flow hydraulic pumps each having an external swashplate control via which an internal swashplate of the pump is repositionable to vary output flow from said pump;
two hydraulic motors respectively installed in operative relation between the two pumps and the two drive wheels to effect driven rotation of the drive wheels using said output flow from said pumps;

a pair of drive control levers each movably supported on frame in a manner pivotable longitudinally forward and rearward, about a lateral pivot axis, from a neutral position to control a rotational direction and speed of a respective one of the drive wheels, and also laterally tiltable, in said neutral position, between an inboard driving position, and an outboard braking position tilted laterally outward therefrom;

two parking brakes of respectively operable relation to the two drive wheels, and actuable between locked states preventing rotation of said drive wheels and unlocked states allowing rotation of said drive wheels;

two brake control linkages, each connected between a respective one of the drive control levers and a respective one of the parking brakes, each of said brake control linkages comprising:

a bell crank movably mounted to the frame for rotatable movement relative thereto about a rotational support point;

a lever connection link having a first end coupled to the bell crank, and a second end coupled to a respective one of the drive control levers; and a brake connection link having a first end coupled to the bell crank, and a second end coupled to the respective one of the parking brakes;

wherein at least one of the brake linkages is further characterized by at least one of the following features:

(a) the bell crank is a flat plate of uniplanar form;

(b) the lever connection link and the brake connection link of each brake control linkage are both coupled to the bell crank at a same common side thereof; and/or (c) the bell crank has a profiled edge whose shape profile comprises a first recess, a second recess, and a crested intermediary region that is disposed between said first and second recesses and is of raised relation thereto within said shape profile.

9. The work machine of claim 8 wherein said at least one of the brake control linkages is characterized by inclusion of at least feature (a).

10. The work machine of claim 8 wherein said at least one of the brake control linkages characterized by inclusion of at least feature (b).

11. The work machine of claim 10 wherein the bell crank of said at least one of the brake control linkages, at said same common side thereof at which the lever connection and brake connection links are both coupled thereto, is characterized by a uniplanar facial surface, adjacent to which the first ends of the lever connection and brake connection links both reside.

12. The work machine of claim 8 wherein said at least one of the brake control linkages is characterized by inclusion of at least feature (c).

13. The work machine of claim 12 further comprising, for each of said at least one of the drive control linkages, a respective cam follower positioned and biased for engagement with said profiled edge of the bell crank for camming relationship between said bell crank and said respective cam follower during transition of the respective one of the drive control levers between the inboard driving and outboard braking positions.

14. The work machine of claim 12 wherein said profiled edge resides at an outside perimeter of the bell crank.

15. The work machine of claim 8 wherein said at least one of the brake control linkages comprises both thereof.

16. The work machine of claim 8 further comprising, for each of said at least one of the drive control linkages, a respective position detection switch positioned for actuation by a perimeter edge of the bell crank when the respective one of the drive control levers is in one of said inboard driving and outboard braking positions, whereby the bell crank doubles as a switch actuator for said respective position detection switch.

17. A ride-on zero-turn work machine comprising:

a frame;

two drive wheels rotatably supported at opposing lateral sides of the frame for driven locomotion and steering of the machine;

two caster wheels rotatably supported in respective adjacency to said opposing lateral sides of the frame in positions of leading relation to the drive wheels in a forward travel direction of the machine;

two variable flow hydraulic pumps each having an external swashplate control via which an internal swashplate of the pump is repositionable to vary output flow from said pump;

two hydraulic motors respectively installed in operative relation between the two pumps and the two drive wheels to effect driven rotation of the drive wheels using said output flow from said pumps;

a pair of drive control levers each movably supported on frame in a manner pivotable longitudinally forward and rearward, about a lateral pivot axis, from a neutral position to control a rotational direction and speed of a respective one of the drive wheels, and also laterally tiltable, in said neutral position, between an inboard driving position, and an outboard braking position tilted laterally outward therefrom;

two parking brakes of respectively operable relation to the two drive wheels, and actuable between locked states preventing rotation of said drive wheels and unlocked states allowing rotation of said drive wheels;

two brake control linkages, each connected between a respective one of the drive control levers and a respective one of the parking brakes, each of said brake control linkages comprising:

a bell crank movably mounted to the frame for rotatable movement relative thereto about a rotational support point;

a lever connection link having a first end coupled to the bell crank, and a second end coupled to a respective one of the drive control levers; and a brake connection link having a first end coupled to the bell crank, and a second end coupled to the respective one of the parking brakes; and for each of said brake control linkages, a respective position detection switch positioned for actuation by a perimeter edge of the bell crank when the respective one of the drive control levers is in one of said inboard driving and outboard braking positions, whereby the bell crank doubles as a switch actuator for said respective position detection switch.

18. The work machine of claim 17 wherein the bell crank of at least one of the brake control linkages is a flat plate of uniplanar form.

19. The work machine of claim 17 wherein said perimeter edge of the bell crank of each brake control linkage comprises a cam-profiled edge segment against which a respective cam follower is biased to impart physical resistance to rotation of said bell crank.

* * * * *